United States Patent
Nam et al.

(10) Patent No.: US 10,701,356 B2
(45) Date of Patent: Jun. 30, 2020

(54) IMAGE DECODING METHOD AND APPARATUS BY DERIVING A FREQUENCY COMPONENT BASED ON FILTERING IN IMAGE CODING SYSTEM

(71) Applicant: LG ELECTRONICS INC., Seoul (KR)

(72) Inventors: Junghak Nam, Seoul (KR); Chulkeun Kim, Seoul (KR); Sehoon Yea, Seoul (KR)

(73) Assignee: LG ELECTRONIC INC., Seoul (KR)

( * ) Notice: Subject to any disclaimer, the term of this patent is extended or adjusted under 35 U.S.C. 154(b) by 60 days.

(21) Appl. No.: 15/766,278

(22) PCT Filed: Oct. 13, 2016

(86) PCT No.: PCT/KR2016/011469
§ 371 (c)(1),
(2) Date: Apr. 5, 2018

(87) PCT Pub. No.: WO2017/065509
PCT Pub. Date: Apr. 20, 2017

(65) Prior Publication Data
US 2018/0295363 A1    Oct. 11, 2018

Related U.S. Application Data

(60) Provisional application No. 62/241,078, filed on Oct. 13, 2015, provisional application No. 62/248,300, filed on Oct. 30, 2015.

(51) Int. Cl.
*H04N 19/117* (2014.01)
*H04N 19/174* (2014.01)
(Continued)

(52) U.S. Cl.
CPC ......... *H04N 19/117* (2014.11); *H04N 19/139* (2014.11); *H04N 19/17* (2014.11);
(Continued)

(58) Field of Classification Search
CPC ...... H04N 19/117; H04N 19/86; H04N 19/82; H04N 19/18; H04N 19/70; H04N 19/17;
(Continued)

(56) References Cited

U.S. PATENT DOCUMENTS

2007/0116125 A1    5/2007  Wada et al.
2009/0180705 A1    7/2009  Hwang et al.
(Continued)

FOREIGN PATENT DOCUMENTS

CN    102572435 A    7/2012
CN    103037212 A    4/2013
(Continued)

OTHER PUBLICATIONS

Dae Ki Kang, "Chapter 13 Image Conversion", Dongseo University, 2011 First Semester Syllabus, Mar. 10, 2011.

*Primary Examiner* — Susan E. Hodges
(74) *Attorney, Agent, or Firm* — Dentons US LLP

(57) ABSTRACT

An image decoding method performed by a decoding apparatus according to the present invention comprises the steps of: generating a reconstruction area for a target area within a current picture; deriving a predetermined plurality of basic filters for the target area; updating at least one basic filter among the plurality of basic filters; receiving weight information for each of the basic filters; determining a merge filter for the target area on the basis of the basic filters and the weight information; and generating a modified reconstruction area by performing filtering on the target area on the basis of the filter coefficient of the determined merge filter. The present invention allows updating with filter (Continued)

information suitable for improving the visual quality of the target area and can thereby improve the accuracy of filtering and overall coding efficiency.

7 Claims, 17 Drawing Sheets

(51) Int. Cl.
    *H04N 19/46*     (2014.01)
    *H04N 19/80*     (2014.01)
    *H04N 19/44*     (2014.01)
    *H04N 19/85*     (2014.01)
    *H04N 19/625*    (2014.01)
    *H04N 19/48*     (2014.01)
    *H04N 19/17*     (2014.01)
    *H04N 19/70*     (2014.01)
    *H04N 19/18*     (2014.01)
    *H04N 19/82*     (2014.01)
    *H04N 19/86*     (2014.01)
    *H04N 19/139*    (2014.01)

(52) U.S. Cl.
    CPC ........... *H04N 19/174* (2014.11); *H04N 19/18* (2014.11); *H04N 19/44* (2014.11); *H04N 19/46* (2014.11); *H04N 19/48* (2014.11); *H04N 19/625* (2014.11); *H04N 19/70* (2014.11); *H04N 19/80* (2014.11); *H04N 19/82* (2014.11); *H04N 19/85* (2014.11); *H04N 19/86* (2014.11)

(58) Field of Classification Search
    CPC ...... H04N 19/48; H04N 19/80; H04N 19/139; H04N 19/625; H04N 19/85; H04N 19/44; H04N 19/174; H04N 19/46
    USPC ........................................................ 375/240
    See application file for complete search history.

(56) References Cited

U.S. PATENT DOCUMENTS

| | | | |
|---|---|---|---|
| 2011/0228843 A1* | 9/2011 | Narroschke | H04N 19/46 375/240.03 |
| 2014/0112595 A1 | 4/2014 | Huang | |
| 2014/0286392 A1 | 9/2014 | Lim et al. | |

FOREIGN PATENT DOCUMENTS

| | | |
|---|---|---|
| CN | 104883579 A | 9/2015 |
| EP | 2352293 A1 | 8/2011 |
| KR | 10-2009-0078617 A | 7/2009 |
| KR | 10-2011-0051497 A | 5/2011 |
| KR | 10-2011-0093811 A | 8/2011 |

* cited by examiner

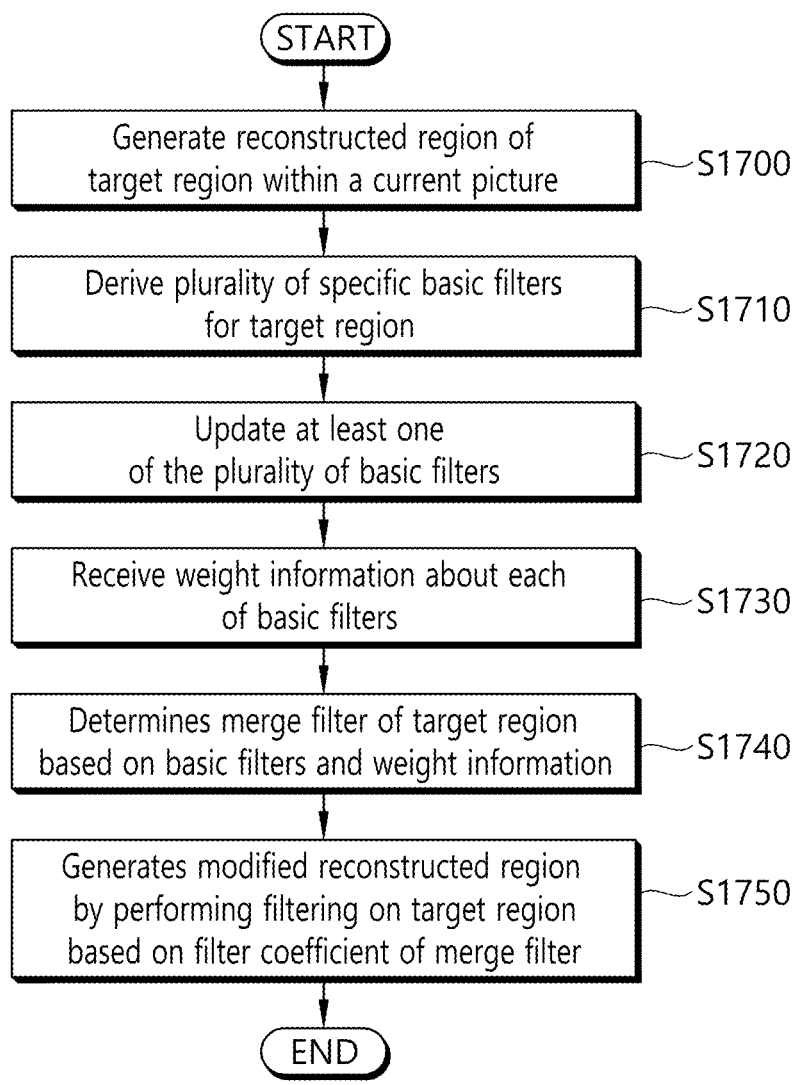

IMAGE DECODING METHOD AND APPARATUS BY DERIVING A FREQUENCY COMPONENT BASED ON FILTERING IN IMAGE CODING SYSTEM

CROSS-REFERENCE TO RELATED APPLICATIONS

This application is the National Stage filing under 35 U.S.C. 371 of International Application No. PCT/KR2016/011469, filed on Oct. 13, 2016, which claims the benefit of U.S. Provisional Applications No. 62/241,078 filed on Oct. 13, 2015, and No. 62/248,300 filed on Oct. 30, 2015, the contents of which are all hereby incorporated by reference herein in their entirety.

BACKGROUND OF THE INVENTION

Field of the Prevent Invention

The present invention relates to a video coding technology and, more particularly, to a method and apparatus for decoding video in a video coding system.

Related Art

Demand for high-resolution, high-quality images, such as high definition (HD) images and ultra high definition (UHD) images, are increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

An object of the present invention is to provide a method and apparatus for improving video coding efficiency.

Another object of the present invention is to provide a method and apparatus for improving the subjective/objective picture quality of video.

Yet another object of the present invention is to provide a filtering method and apparatus based on a frequency component.

Yet another object of the present invention is to provide a method and apparatus for updating a filter in a specific unit, for improving the subjective/objective picture quality of video.

In accordance with one embodiment of the present invention, there is provided a video decoding method performed by a decoding apparatus. The method includes the steps of obtaining high frequency (HF) filtering information through a bitstream, deriving a frequency domain reconstructed block by performing frequency transform on a reconstructed block of a current block in a spatial domain, deriving the low frequency component of the frequency domain reconstructed block based on low pass filtering for the frequency domain reconstructed block, deriving the high frequency component of the frequency domain reconstructed block based on the frequency domain reconstructed block and the low frequency component of the frequency domain reconstructed block, filtering the high frequency component based on the HF filtering information, deriving a modified frequency domain reconstructed block based on the filtered high frequency component and the low frequency component, and deriving a modified reconstructed block of the spatial domain for the current block based on frequency inverse transform for the modified frequency domain reconstructed block.

In accordance with another embodiment of the present invention, there is provided a video decoding method performed by a decoding apparatus. The method includes the steps of generating a reconstructed region of a target region within a current picture, deriving a plurality of specific basic filters for the target region, updating at least one of the plurality of basic filters, receiving weight information about each of the basic filters, determining a merge filter of the target region based on the basic filters and the weight information, and generating a modified reconstructed region by performing filtering on the target region based on a filter coefficient of the determined merge filter.

In accordance with another embodiment of the present invention, there is provided a decoding apparatus performing video decoding. The decoding apparatus includes an entropy decoder obtaining high frequency (HF) filtering information through a bitstream, a transform unit deriving a frequency domain reconstructed block by performing frequency transform on a reconstructed block of a current block in a spatial domain, a filter unit deriving the low frequency component of the frequency domain reconstructed block based on low pass filtering for the frequency domain reconstructed block, deriving the high frequency component of the frequency domain reconstructed block based on the frequency domain reconstructed block and the low frequency component of the frequency domain reconstructed block, filtering the high frequency component based on the HF filtering information, and deriving a modified frequency domain reconstructed block based on the filtered high frequency component and the low frequency component, and an inverse transformer deriving a modified reconstructed block of the spatial domain for the current block based on frequency inverse transform for the modified frequency domain reconstructed block.

In accordance with another embodiment of the present invention, there is provided a decoding apparatus performing video decoding. The decoding apparatus includes a reconstruction region generation unit generating a reconstructed region of a target region within a current picture, a filter unit deriving a plurality of specific basic filters for the target region, updating at least one of the plurality of basic filters, determining a merge filter of the target region based on the basic filters and the weight information, and generating a modified reconstructed region by performing filtering on the target region based on a filter coefficient of the determined merge filter, and an entropy decoder receiving weight information about each of the basic filters.

In accordance with yet another embodiment of the present invention, there is provided a video encoding method performed by a encoding apparatus. The method includes the steps of deriving a frequency domain original block by performing frequency transform on an original block of a current block in a spatial domain, deriving a frequency domain reconstructed block by performing frequency transform on a reconstructed block of the current block in the spatial domain, deriving a low frequency (LF) component of the frequency domain original block and the low frequency component of the frequency domain reconstructed block based on low pass filtering for the frequency domain original block and the frequency domain reconstructed block, deriving the high frequency component of the frequency domain original block and the high frequency component of the frequency domain reconstructed block based on the low frequency component of the frequency domain original block, the low frequency component of the frequency domain reconstructed block, a frequency component of the frequency domain original block, and a frequency component of the frequency domain reconstructed block, deriving HF filtering information based on the high frequency component of the frequency domain original block and the high frequency component of the frequency domain preliminary reconstructed block, and encoding and outputting the HF filtering information.

In accordance with yet another embodiment of the present invention, there is provided a video encoding method performed by an encoding apparatus. The method includes the steps of generating the reconstructed region of a target region within a current picture, deriving a plurality of specific basic filters for the target region, updating at least one of the plurality of basic filters, generating weight information about each of the basic filters, determining the merge filter of the target region based on the basic filters and the weight information, generating a modified reconstructed region by performing filtering on the target region based on the filter coefficient of the determined merge filter, and encoding and outputting information about the merge filter including the weight information.

In accordance with yet another embodiment of the present invention, there is provided a video encoding apparatus. The encoding apparatus includes a transform unit deriving a frequency domain original block by performing frequency transform on an original block of a current block in a spatial domain and deriving a frequency domain reconstructed block by performing frequency transform on a reconstructed block of the current block in the spatial domain, a filter unit deriving a low frequency (LF) component of the frequency domain original block and the low frequency component of the frequency domain reconstructed block based on low pass filtering for the frequency domain original block and the frequency domain reconstructed block, deriving the high frequency component of the frequency domain original block and the high frequency component of the frequency domain reconstructed block based on the low frequency component of the frequency domain original block, the low frequency component of the frequency domain reconstructed block, a frequency component of the frequency domain original block, and a frequency component of the frequency domain reconstructed block, and deriving HF filtering information based on the high frequency component of the frequency domain original block and the high frequency component of the frequency domain preliminary reconstructed block, and an entropy encoder encoding and outputting the HF filtering information.

In accordance with yet another embodiment of the present invention, there is provided a video encoding apparatus. The encoding apparatus includes a reconstruction region generation unit generating the reconstructed region of a target region within a current picture, a filter unit deriving a plurality of specific basic filters for the target region, updating at least one of the plurality of basic filters, generating weight information about each of the basic filters, determining the merge filter of the target region based on the basic filters and the weight information, generating a modified reconstructed region by performing filtering on the target region based on the filter coefficient of the determined merge filter, and an entropy encoder encoding and outputting information about the merge filter including the weight information.

In accordance with the present invention, a current block can be divided into a low frequency component and a high frequency component and filtering can be performed on them. Accordingly, the computational complexity of filtering can be reduced.

In accordance with the present invention, a current block can be divided into a low frequency component and a high frequency component and filtering can be performed on them. Accordingly, the accuracy of filtering can be enhanced, and overall coding efficiency can be improved.

In accordance with the present invention, a filtering target region can be updated based on filter information suitable for visual quality improvement. Accordingly, the accuracy of filtering can be enhanced, and overall coding efficiency can be improved.

BRIEF DESCRIPTION OF THE DRAWINGS

FIG. 17 schematically shows a video coding method by the decoding apparatus according to the present invention.

DESCRIPTION OF EXEMPLARY EMBODIMENTS

Figure 1:
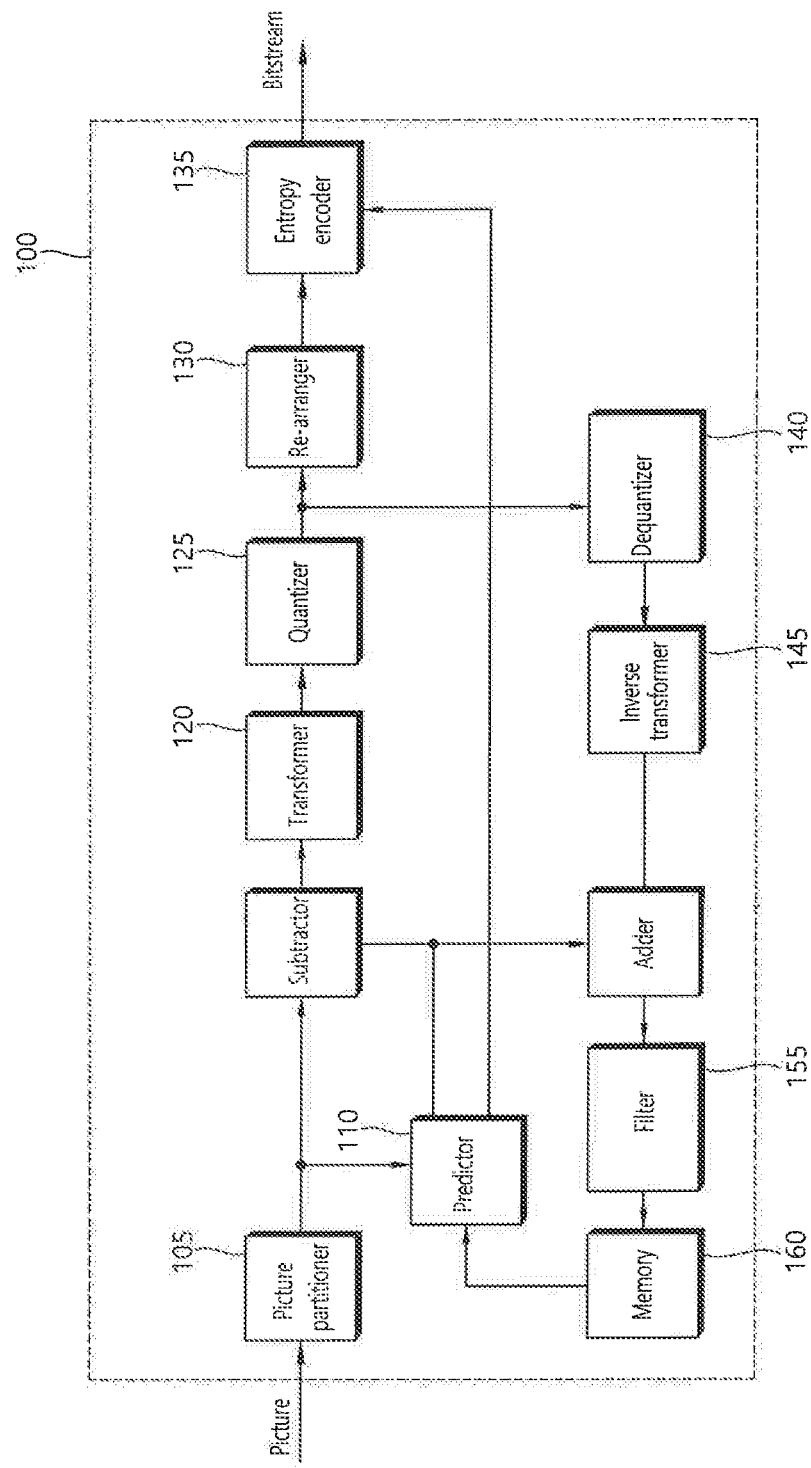
FIG. 1 is a block diagram schematically illustrating a video encoder according to an embodiment of the prevent invention.

The present invention can be modified in various forms, and specific embodiments thereof will be described and shown in the drawings. However, the embodiments are not intended for limiting the prevent invention. The terms used in the following description are used to merely describe specific embodiments, but are not intended to limit the prevent invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the prevent invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the prevent invention without departing from the concept of the prevent invention.

Hereinafter, exemplary embodiments of the prevent invention will be described in detail with reference to the accompanying drawings.

FIG. 1 is a block diagram schematically illustrating a video encoder according to an embodiment of the prevent invention.

Referring to FIG. 1, a video encoder 100 includes a picture partitioner 105, a predictor 110, a transformer 120, a quantizer 125, a dequantizer 140, a re-arranger 130, an entropy encoder 135, an inverse transformer 145, a filter 155, and a memory 160.

The picture partitioner 105 may be configured to split the input picture into at least one processing unit block. In this connection, a block as a processing unit may be a predictor PU, a transform unit TU, or a coding unit CU. The picture may be composed of a plurality of coding tree unit CTUs. Each CTU may be split into CUs as a quad tree structure. The CU may be split into CUs having a lower depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter predictor that performs an inter prediction process and an intra predictor that performs an intra prediction process, as will be described later. The predictor 110 performs a prediction process on the processing units of a picture divided by the picture partitioner 105 to create a prediction block including a prediction sample or a prediction sample array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information, such as the index of a reference picture selected through inter prediction, a motion vector difference MDV, a motion vector predictor (MVP), and a residual signal, etc., may be entropy-encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. In this case, it may be determined whether a filter should be applied to a reference sample depending on the intra prediction mode and/or the size of a current block.

Residual values (a residual block or a residual signal) between the constructed prediction block and the original block are input to the transformer 120. The prediction mode information, the motion vector information, and the like used for the prediction are encoded along with the residual values by the entropy encoder 135 and are transmitted to the decoder.

The transformer 120 performs a transform process on the residual block in the unit of TUs and creates transform coefficients.

A transform block is a rectangular block of samples and is a block to which the same transform is applied. The transform block may be a TU and may have a quad-tree structure.

The transformer 120 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 120 may construct a transform block of transform coefficients through the transform.

The quantizer 125 may quantize the residual values, that is, transform coefficients transformed by the transformer 120, and may create quantization coefficients. The values calculated by the quantizer 125 may be supplied to the dequantizer 140 and the re-arranger 130.

The re-arranger 130 may rearrange the transform coefficients supplied from the quantizer 125. By rearranging the quantization coefficients, it is possible to enhance the encoding efficiency in the entropy encoder 135.

The re-arranger 130 may rearrange the quantized transform coefficients in the form of a two-dimensional block to the form of a one-dimensional vector using a coefficient scanning method.

The entropy encoder 135 may be configured to entropy code the symbol according to a probability distribution based on the quantized transform values rearranged by the re-arranger 130 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called as a residual block in a block unit, and can be called as a residual sample in a sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes, such as exponential Golomb, context-adaptive variable length coding (CAVLC), and context-adaptive binary arithmetic coding (CABAC), may be used for the entropy encoding. For example, the entropy encoder 135 may store therein a table for performing entropy encoding, such as a variable length coding/code (VLC) table. The entropy encoder 135 may perform entropy encoding using the stored VLC table. Further, the entropy encoder 135 derives a binarization method of a corresponding symbol and a probability model of a corresponding symbol/bin, and then performs entropy encoding using the derived binarization method or probability model.

The entropy encoder 135 may give a predetermined change to a parameter set or syntaxes to be transmitted, if necessary.

The dequantizer 140 dequantizes the values transform coefficients quantized by the quantizer 125. The inverse transformer 145 inversely transforms the values dequantized by the dequantizer 140.

The residual value or residual sample or residual sample array generated by the dequantizer 140 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an addition unit. In this case, the addition unit may be considered as a particular element reconstructed block generator that generates a reconstructed block.

The filter 155 applies a deblocking filter, an ALF Adaptive Loop Filter, a sample adaptive offset (SAO) to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

Meanwhile, the filter 155 may not perform a filtering operation on the reconstructed block used in the inter prediction.

The memory 160 may store the reconstructed block or picture calculated by the filter 155. The reconstructed block or picture stored in the memory 160 may be supplied to the predictor 110 that performs the inter prediction.

Figure 2:
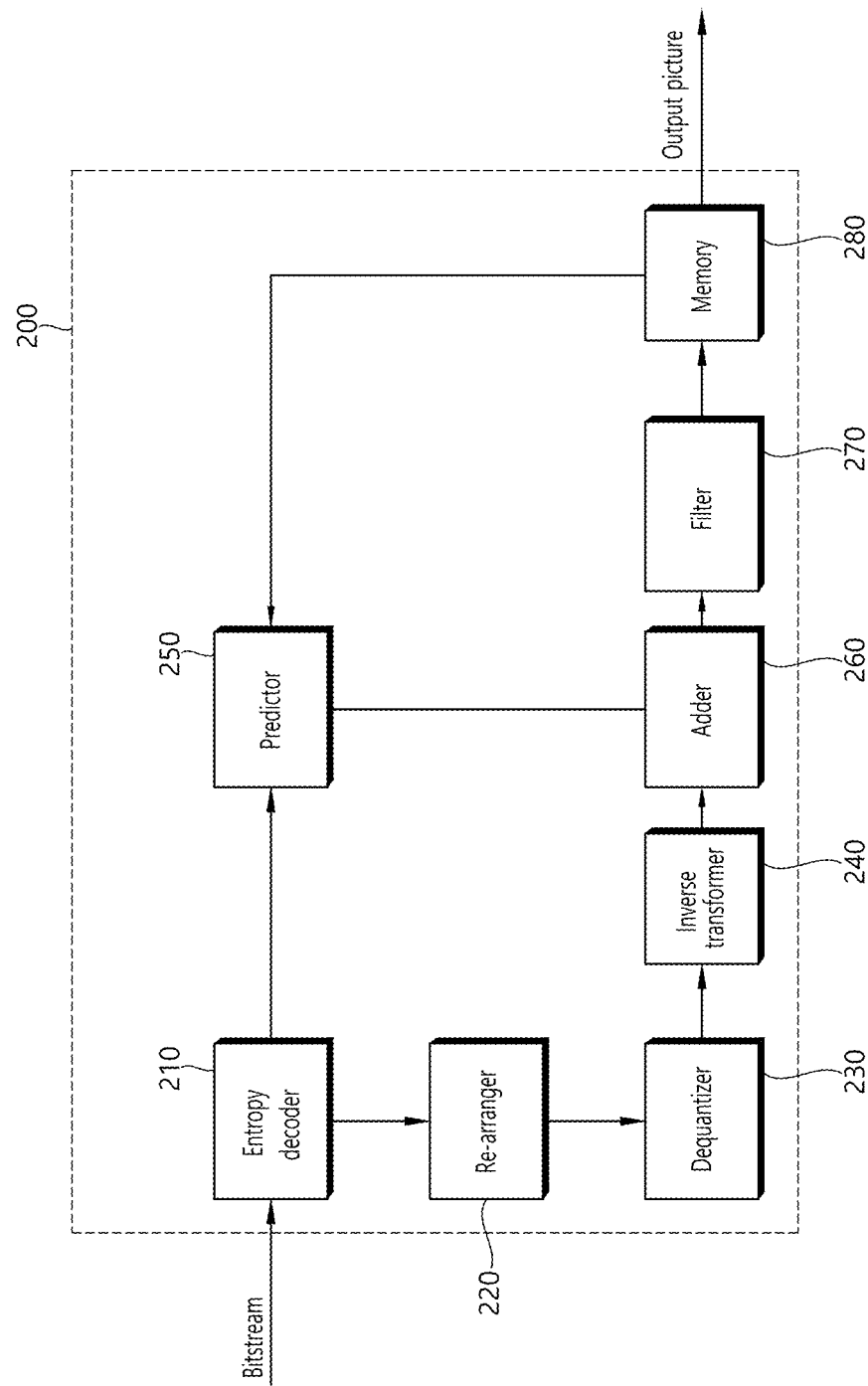
FIG. 2 is a block diagram schematically illustrating a video decoder according to an embodiment of the prevent invention.

FIG. 2 is a block diagram schematically illustrating a video decoder according to an embodiment of the prevent invention. Referring to FIG. 2, a video decoder 200 may include an entropy decoder 210, a re-arranger 220, a dequantizer 230, an inverse transformer 240, a predictor 250, a filter unit 270, and a memory 280.

When a video bitstream is input from the video encoder, the input bitstream may be decoded on the basis of the order in which video information is processed by the video encoder.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a variable length coding (hereinafter referred to as "VLC"), such as CAVLC, is used to perform entropy encoding in a video encoder, the entropy decoder 210 may perform decoding using the same VLC table as the encoder used in the encoder. Further, when CABAC is used to perform entropy encoding in a video encoder, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 250, and the residual values, that is, the quantized transform coefficients, entropy-decoded by the entropy decoder 210 may be input to the re-arranger 220.

The re-arranger 220 may rearrange the bitstream information, that is, the quantized transform coefficients, entropy-decoded by the entropy decoder 210 on the basis of the rearrangement method in the video encoder.

The re-arranger 220 may reconstruct and rearrange the coefficients expressed in the form of a one-dimensional vector into coefficients in the form of a two-dimensional block. The re-arranger 220 may scan the coefficients on the basis of the prediction mode applied to the current block transform block and the size of the transform block and may create an array of coefficients quantized transform coefficients in the form of a two-dimensional block.

The dequantizer 230 may perform dequantization on the basis of the quantization parameters supplied from the video encoder and the coefficient values of the rearranged block.

The inverse transformer 240 may perform the inverse DCT and/or inverse DST of the DCT and/or DST, which has been performed by the transformer of the video encoder, on the quantization result from the video encoder.

The inverse transform may be performed on the basis of a transfer unit or a partition unit of a picture determined by the video encoder. The transformer of the video encoder may selectively perform the DCT and/or DST depending on plural information pieces such as the prediction method, the size of a current block, and the prediction direction, and the inverse transformer 240 of the video decoder may perform the inverse transform on the basis of the transform information on the transform performed by the transformer of the video encoder.

The predictor 250 generates a prediction block including a prediction sample or a prediction sample array based on the prediction block generation-related information provided by the entropy decoder 210 and the previously decoded block and/or picture information provided from the memory 280.

If the prediction mode for the current PU is the intra prediction mode, the predictor 250 may perform the intra prediction to generate a prediction block based on pixel information in the current picture.

If the prediction mode for the current PU is the inter prediction mode, the predictor 250 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The predictor 250 may generate a prediction block such that the residual signal relative to the current block is minimized and the motion vector size is minimized when inter prediction is performed on the current picture.

Meanwhile, the motion information derivation method may be changed according to the prediction mode of the current block. The prediction mode applied to inter prediction may include an advanced motion vector prediction (AMVP) mode, a merge mode, and the like.

In one example, when the merge mode is applied, the encoder and decoder may generate a merge candidate list using a motion vector for a reconstructed spatial neighboring block and/or is a motion vector corresponding to a Col block as a temporal neighboring block. In the merge mode, a motion vector of a candidate block selected from the merge candidate list is used as a motion vector of a current block. The encoder may transmit to the decoder a merge index indicating a candidate block having an optimal motion vector as selected from candidate blocks included in the merge candidate list. In this connection, the decoder may derive a motion vector for the current block using the merge index.

In another example, when the AMVP mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which blocks motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the predictor 250 and the residual block provided by the inverse-transformer 225. FIG. 2 illustrates that using the addition unit, the prediction block and the residual block are combined to generate the reconstructed block. In this connection, the addition unit may be viewed as a separate element (a reconstructed region generator) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

For a block that the skip mode is applied, the residual signal may not be transmitted and the predicted block may be used as a reconstructed block.

The reconstructed block and/or picture may be supplied to the filter unit 270. The filter unit 270 may perform a deblocking filtering operation, an SAO operation, and/or an ALF operation on the reconstructed block and/or picture.

The memory 280 may store the reconstructed picture or block for use as a reference picture or a reference block and may supply the reconstructed picture to an output module.

The elements that is directly related to decoding images among the entropy decoder 210, the rearranger 220, the dequantizer 230, the inverse transformer 240, the predictor 250, the filter unit 270 and the memory 280 which are included in the video decoder 200, for example, the entropy decoder 210, the rearranger 220, the dequantizer 230, the inverse transformer 240, the predictor 250, the filter unit 270, and so on may be expressed as a decoder or a decoder that is distinguished from other elements.

In addition, the video decoder 200 may further include a parser not shown in the drawing that parses information related to the encoded images included in a bitstream. The parser may include the entropy decoder 210, and may be included in the entropy decoder 210. Such a parser may also be implemented as an element of the decoder.

As described above, an in-loop filter may be applied to a reconstructed picture in order to compensate for a difference between the original picture and a reconstructed picture attributable to an error generated in a compression coding process, such as quantization. Furthermore, as described above, the in-loop filtering may be performed in the filter units of the encoder and the decoder. The filter unit may apply a deblocking filter, a sample adaptive offset (SAO) and/or an adaptive loop filter (ALF), and a condensed prediction filter (CPF) to a reconstructed picture. In this case, the ALF may perform filtering based on a value obtained by comparing a reconstructed picture with the original picture after a deblocking filtering and/or SAO process is performed. The ALF may adaptively apply a Wiener filter to a reconstructed picture after a deblocking filtering and/or SAO process is performed. That is, the ALF may compensate for a coding error using the Wiener filter.

Furthermore, the CPF may derive a modified reconstructed picture by deriving a filter coefficient based on each of the plurality of basic filters of a reconstructed picture and the original picture and performing filtering based on the filter coefficient. In this case, the reconstructed picture may be a picture after a deblocking filtering and/or SAO process is performed. For example, the basic filter may include four types of filters.

If the CPF is applied, coding efficiency can be improved because an error between the original picture and the reconstructed picture can be reduced, but computational complexity of a process of performing filtering and the amount of data of filter information for the CPF may be increased. Accordingly, the present invention proposes a method of lowering computational complexity compared to the existing CPF and performing filtering and a method of improving coding efficiency by reducing the amount of data of filter information for the CPF of a block.

Figure 3:
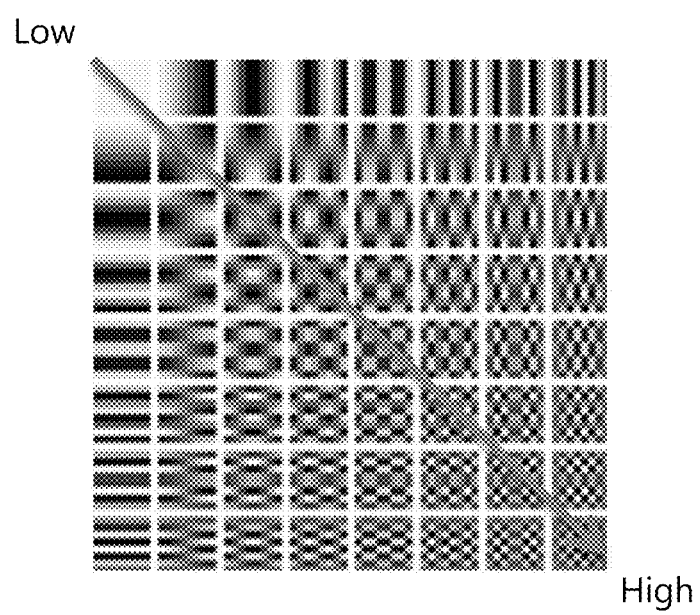
FIG. 3 illustrates an example of frequency components according to a discrete cosine transform (DCT) basis function of an 8×8 size.

FIG. 3 illustrates an example of frequency components according to a discrete cosine transform (DCT) basis function of an 8×8 size. For example, FIG. 3 may show the frequency components of a frequency domain reconstructed block derived by performing frequency transform on the reconstructed block of a current block. Referring to FIG. 3, frequency components may appear from a low frequency (LF) component to a high frequency (HF) component toward a direction indicated by an arrow of FIG. 3 in the frequency domain region derived based on the basis function. A region within each frequency domain, that is, a filter corresponding to each frequency component and a spatial domain component corresponding to each frequency component may be derived through inverse discrete cosine transform (IDCT) corresponding to the DCT basis function.

Figure 4:
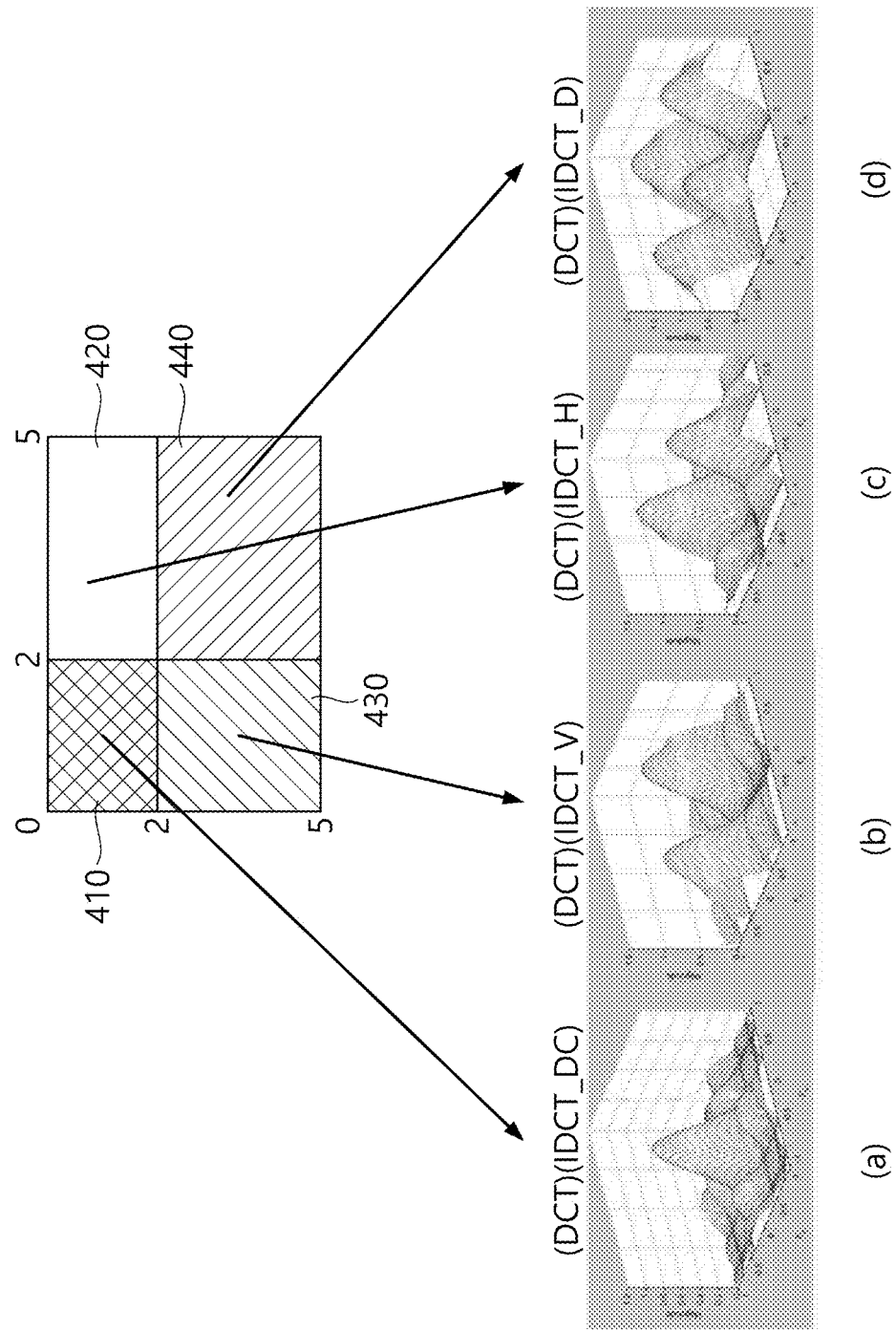
FIG. 4 illustrates an example of filters corresponding to respective frequency components.

FIG. 4 illustrates an example of filters corresponding to respective frequency components. FIG. 4 is an example of a case where a DCT basis function of a 5×5 size is used. The top-left region 410 of a frequency component based on the DCT basis function may have an LF component. Specifically, when the coordinates of a top-left component within the frequency domain based on the DCT basis function are (0, 0), the region of a location within (0, 0), (0, 2), (2, 0), and (2, 2) may be defined as an LF region. That is, the x coordinates and y coordinates of the LF component may be included in 0 to 2. The characteristics of a filter generated based on IDCT for the LF region may be the same as FIG. 4(a). The IDCT for the LF region may be referred to as "IDCT DC."

Furthermore, when the coordinates of a top-right component within the frequency domain based on the DCT basis function are (5, 0), the top-right region 420 of the DCT basis function may be defined as the region of a location within (2, 0), (2, 2), (5, 0), and (5, 2). That is, the x coordinates of the frequency component of the top-right region may be included in 2 to 5, and the y coordinates thereof may be included in 0 to 2. The characteristics of a filter generated based on IDCT for the top-right region may be the same as FIG. 4(c). The IDCT for the top-right region may be referred to as "IDCT horizontal."

Furthermore, when the coordinates of a bottom-left component within the frequency domain based on the DCT basis function are (0, 5), the bottom-left region 430 of the DCT basis function may be defined as the region of a location within (0, 2), (0, 5), (2, 2), and (2, 5). That is, the x coordinates of the frequency component of the top-right region may be included in 0 to 2, and the y coordinates thereof may be included in 2 to 5. The characteristics of a filter generated based on IDCT for the bottom-left region may be the same as FIG. 4(b). The IDCT for the bottom-left region may be referred to as "IDCT vertical."

Furthermore, when the coordinates of a bottom-right component within the frequency domain based on the DCT basis function are (5, 5), the bottom-right region 440 of the DCT basis function may be defined as the region of a location within (2, 2), (2, 5), (5, 2), and (5, 5). That is, the x coordinates of the frequency component of the bottom-right region may be included in 2 to 5, and the y coordinates thereof may be included in 2 to 5. The characteristics of a filter generated based on IDCT for the bottom-right region may be the same as FIG. 4(d). The IDCT for the bottom-right region may be referred to as "IDCT diagonal."

What the LF region will be defined up to which region, that is, to define the size of the LF region may be different based on the size of a DCT basis function used, the characteristics of input video, and a quantization parameter (QP). An experimentally determined size may be previously defined and used with respect to the LF region, and the encoding apparatus may determine an optimal size, may encode the optimal size, and may output it.

Figure 5:
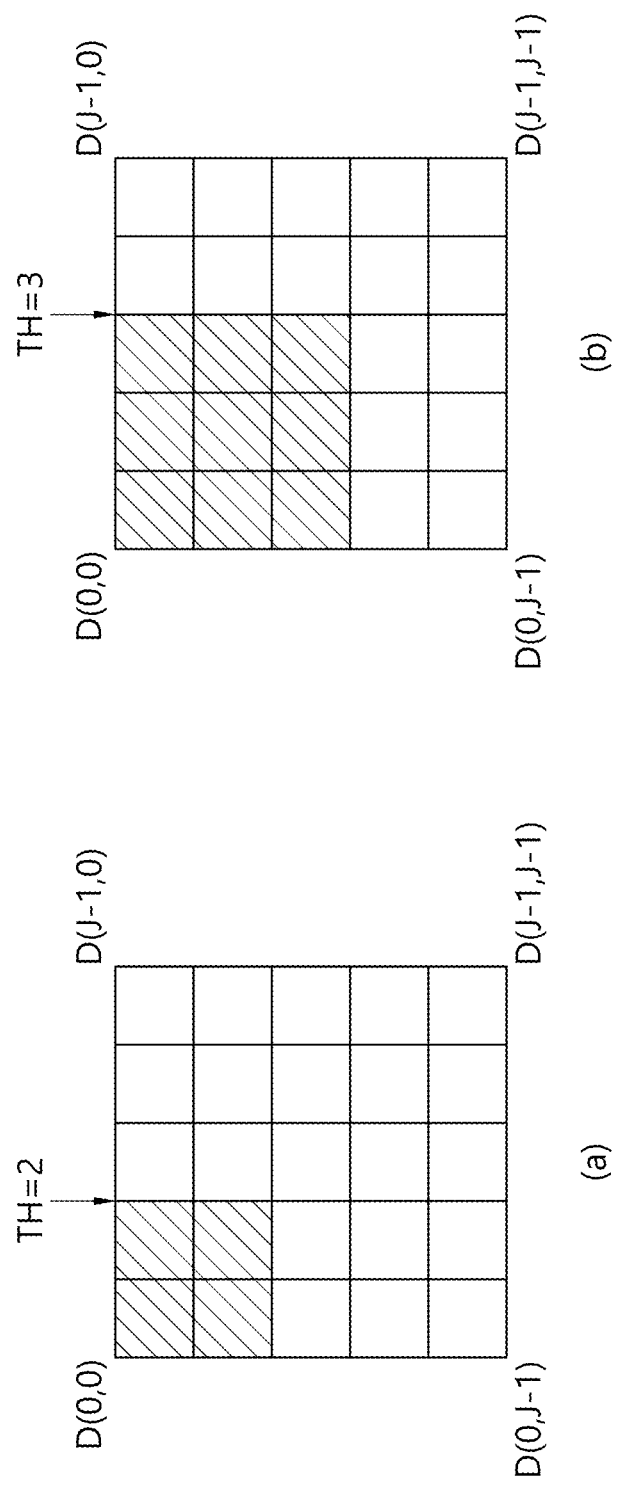
FIG. 5 illustrates an example of a method of defining the size of an LF region.

FIG. 5 illustrates an example of a method of defining the size of the LF region. The threshold of the LF region may be set to 2 as shown in FIG. 5(a), and the threshold of the LF region may be set to 3 as shown in FIG. 5(b). The threshold of the LF region may be called the threshold of a low frequency component, and the size of the LF region may be a reference value. If the threshold of the low frequency component is n, a frequency component based on the DCT basis function, that is, the transform coefficients of a region that belong to transform coefficients within the frequency domain reconstructed block of a current block and that are within an n-th column in the x axis and within an n-th row in the y axis, may be included in the LF region. The threshold may be previously defined or may not be previously defined, and the encoding apparatus may determine the threshold, may encode the threshold for decoding purposes, and may output the encoded threshold.

The encoding apparatus and the decoding apparatus may derive an LF component and an HF component based on low pass filtering (LPF) to which the threshold has been applied. In this case, if a specific filter in the spatial domain is applied, substantially the same function as LPF in the frequency domain may be performed. For example, if the threshold is 2, the size of the LF region may be defined as 2×2 and a frequency component within the LF region may be derived as an LF component. The remaining frequency components of the frequency component except the LF component may be derived as an HF component.

Furthermore, if the threshold is 3, the size of the LF region may be defined as 3×3, and a frequency component within the LF region may be derived as an LF component. The remaining frequency component of the frequency component except the LF component may be derived as an HF component.

When the LPF is defined through the aforementioned method, that is, when the threshold of the LF region is defined, the frequency component based on the DCT basis function may be separated into an LF component and an HF component based on the LPF.

Figure 6:
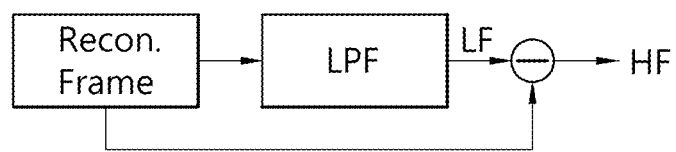
FIG. 6 illustrates an example in which an LF component and an HF component are separated based on an LPF.

FIG. 6 illustrates an example in which an LF component and an HF component are separated based on an LPF. The decoding apparatus may separate the LF component of the entire frequency component using an obtained filter, that is, based on LPF that has obtained information including the threshold, and may then obtain an HF component based on a difference between the LF component and the entire frequency component. In other words, the remaining frequency component of the entire frequency component except the LF component may be derived as the HF component. In the aforementioned method, an LF component and an HF component may be derived by dividing the frequency region into two. As shown in FIG. 4, however, each frequency component may be derived using a filter capable of deriving a frequency component corresponding to each region within a frequency domain. The frequency components may be separated into four types depending on the type of filters used as in FIG. 4 or may be separated into various numbers other than the 4 types.

If an LF component and an HF component are separated by applying the aforementioned method, filtering may be performed on at least the HF component. A filter used for the filtering may be a Wiener filter.

Figure 7:
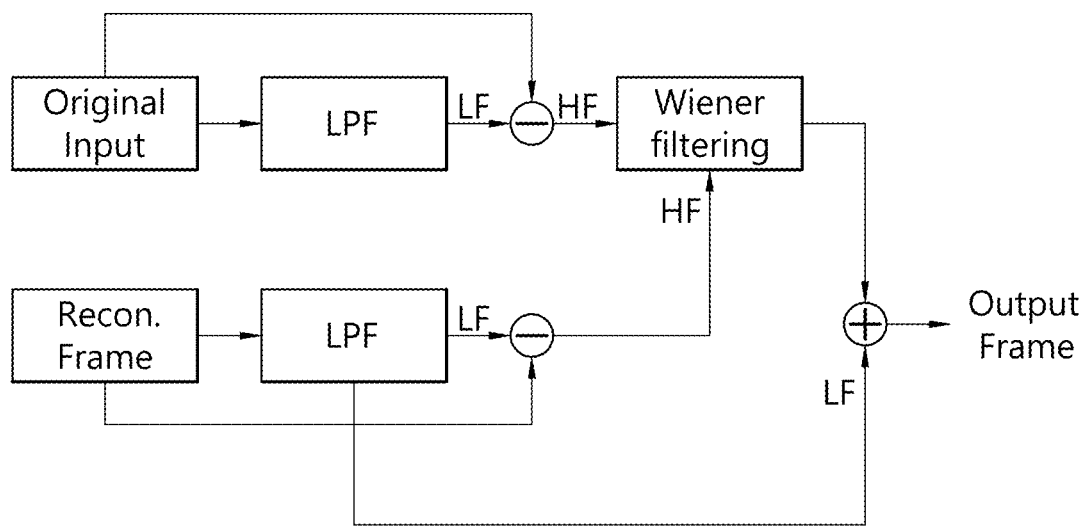
FIG. 7 illustrates an example in which filtering is performed on an HF component based on a Wiener filter.

FIG. 7 illustrates an example in which filtering is performed on the HF component based on the Wiener filter. FIG. 7 may show an example of filtering for the HF component. For example, a Wiener filter may be used for the filtering. A process of performing the filtering may be as follows.

Filtering may be performed in order to derive the LF component of the reconstructed block of a current block (or a reconstructed frame including the current block). The filtering may be performed based on an LPF. The reconstructed block may be derived based on a prediction block derived based on an intra prediction mode or an inter prediction mode.

If the LF component is derived, the HF component of the reconstructed block may be derived based on a difference between the frequency component of the reconstructed block and the LF component of the reconstructed block. Next, the LF component of the original block may be derived based on LPF for the original block of the current block. The HF component of the original block may be derived based on a difference between the frequency component of the original block and the LF component of the original block.

Filtering to minimize a difference between the HF component of the reconstructed block and the HF component of the original block may be performed based on the components. That is, filtering to minimize the amount of data of a frequency domain residual signal between the HF component of the reconstructed block and the HF component of the original block may be performed. In this case, filtering may be performed on the HF component of the reconstructed block and the HF component of the original block based on the Wiener filter. A filtered HF component in which the amount of data of the frequency domain residual signal derived based on the filtering becomes a minimum with respect to the original block may be derived. The modified reconstructed block of the current block may be derived through a combination of the filtered HF component and the LF component of the reconstructed block. Furthermore, the encoding apparatus may encode HF filtering information through the filtering and output the encoded HF filtering information.

The HF component of the reconstructed block may be filtered, but there may be a method of filtering the HF component of the reconstructed block and the LF component of the reconstructed block.

Figure 8:
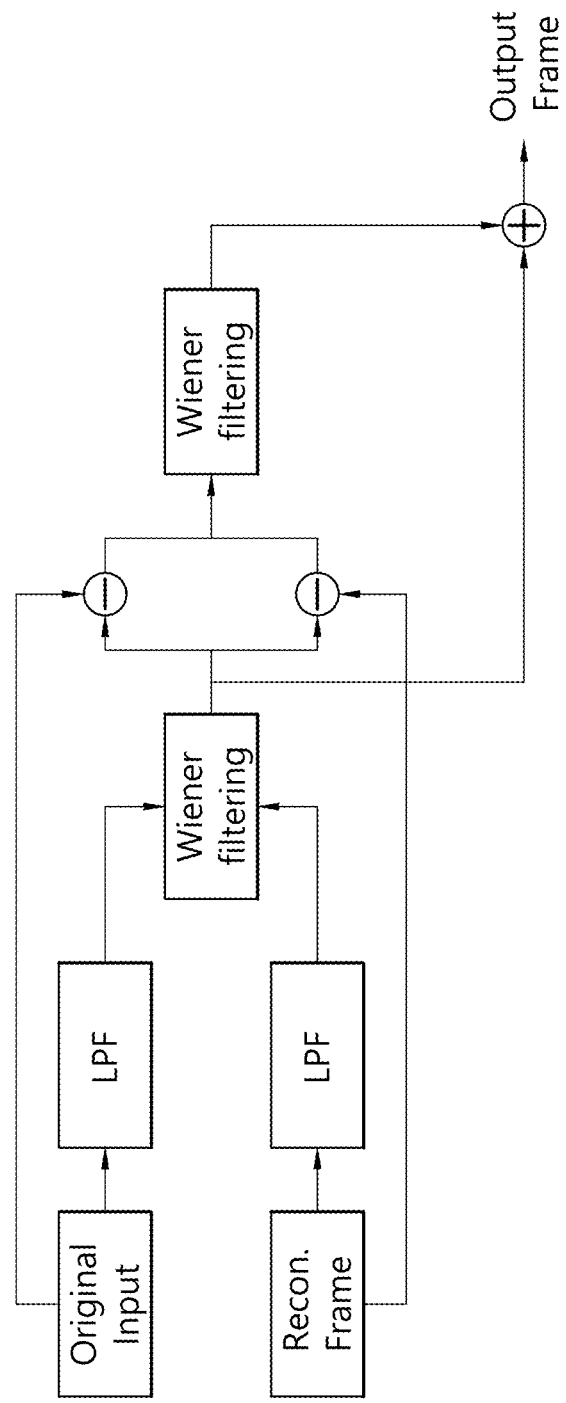
FIG. 8 illustrates an example in which the encoding apparatus performs filtering on the HF component and LF component of a DCT basis function based on a Wiener filter.

FIG. 8 illustrates an example in which the encoding apparatus performs filtering on the HF component and LF component of the DCT basis function based on the Wiener filter. FIG. 8 may show an example of filtering for the HF component and the LF component. A Wiener filter may be used for the filtering. A process of performing the filtering may be as follows.

The encoding apparatus may perform filtering in order to derive the LF component of the reconstructed block of a current block (or a reconstructed frame including the current block). The filtering may be performed based on LPF. The reconstructed block may be derived based on a prediction block derived based on an intra prediction mode or an inter prediction mode. Next, the encoding apparatus may derive the LF component of the original block based on LPF for the original block of the current block.

After the LF component of the reconstructed block and the LF component of the original block are derived, the encoding apparatus may perform filtering to minimize a difference between the LF component of the reconstructed block and the LF component of the original block based on the LF components. That is, the encoding apparatus may perform filtering to minimize the amount of data of a frequency domain residual signal between the LF component of the reconstructed block and the LF component of the original block. In this case, the encoding apparatus may perform the filtering on the LF component of the reconstructed block and the LF component of the original block based on a Wiener filter. The encoding apparatus may derive a filtered LF component in which the amount of data of the frequency domain residual signal becomes a minimum based on the filtering.

Furthermore, the encoding apparatus may derive the HF component of the reconstructed block based on a difference between the frequency component of the reconstructed block and the LF component of the reconstructed block, and may derive the HF component of the original block based on a difference between the frequency component of the original block and the LF component of the original block.

When the HF component of the reconstructed block and the HF component of the original block are derived, the encoding apparatus may perform filtering to minimize a difference between the HF component of the reconstructed block and the HF component of the original block based on the components. That is, the encoding apparatus may perform filtering to minimize the amount of data of a frequency domain residual signal between the HF component of the reconstructed block and the HF component of the original block. In this case, the encoding apparatus may perform the filtering on the HF component of the reconstructed block and the HF component of the original block based on a Wiener filter. The encoding apparatus may derive a filtered HF component in which the amount of data of the frequency domain residual signal derived based on the filtering becomes a minimum with respect to the original block.

The encoding apparatus may derive the modified reconstructed block of the current block through a combination of the filtered HF component and the filtered LF component. Furthermore, the encoding apparatus may encode LF filter information and HF filtering information and output encoded information.

Meanwhile, coding efficiency can be improved by reducing the amount of data of filter information for the CPF of a current block along with the method of further reducing computational complexity compared to the aforementioned existing CPF and performing filtering. In accordance with a method described below, performance of a filter for each prediction block can be improved and visual quality for a prediction block and reconstructed video can be improved by adaptively updating a basic filter used for the CPF.

Figure 9:
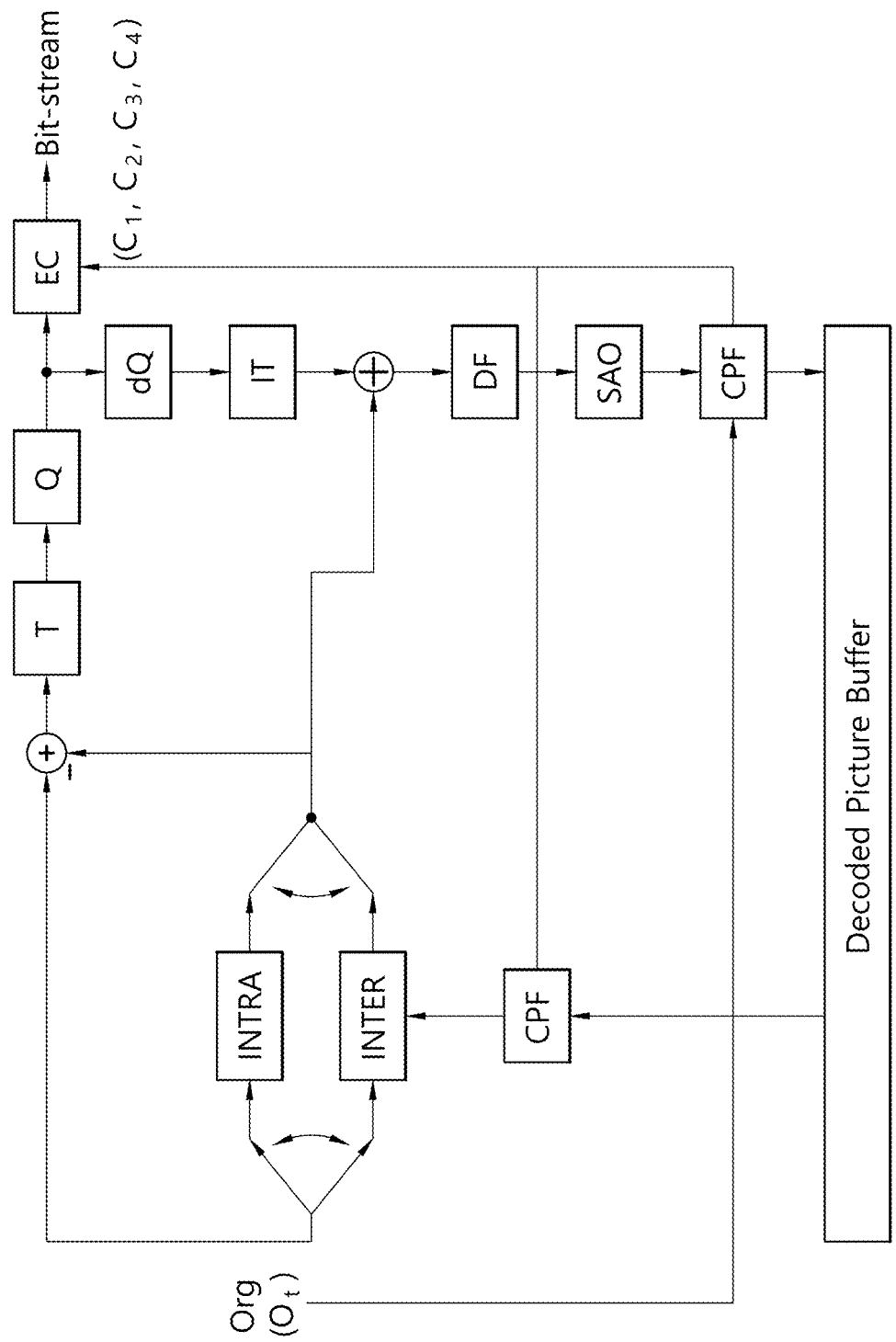
FIG. 9 illustrates an example of an encoding apparatus including a CPF used as a loop filter and/or an adaptive filter.

FIG. 9 illustrates an example of an encoding apparatus including a CPF used as a loop filter and/or an adaptive filter. C1, C2, C3, and C4 shown in FIG. 9 indicate weight information corresponding to the basic filters of a CPF. As shown in FIG. 9, the CPF may be used as a loop filter used to improve visual quality of reconstructed video after the reconstruction of current video is completed. Furthermore, the CPF may be used as the adaptive filter of the reference block of a prediction block for improving visual quality of a prediction block to which inter prediction is applied.

In the video coding system, both the aforementioned two filters may be used or only one of the two filters may be used. If the CPF is used for only the reference block of a prediction block as an adaptive filter, an adaptive loop filter (ALF) may be used for the loop filter.

Figure 10:
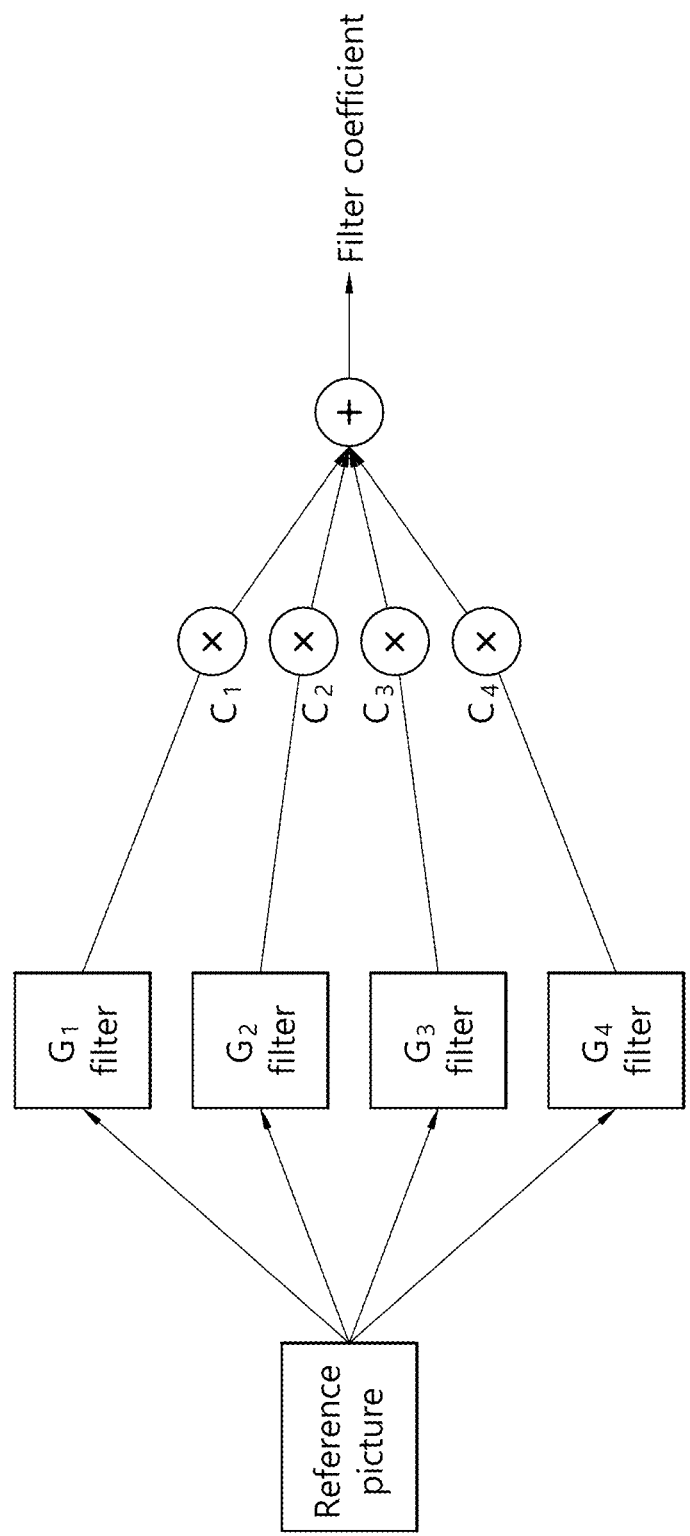
FIG. 10 illustrates an example of a method of a deriving the filter coefficient of a CPF.

FIG. 10 illustrates an example of a method of a deriving the filter coefficient of a CPF. The CPF may be referred to as a "merge filter." The filter coefficient of the merge filter may include a fixed filter that may be indicated as a basic filter and weight. In other words, the filter coefficient of the merge filter may be derived by applying the weight to the basic filter. G1 to G4 shown in FIG. 10 indicate basic filters, and C1 to C4 indicate weights corresponding to the basic filters. The weight may be referred to as "modulation weight." Referring to FIG. 10, the filter coefficient of the merge filter may be derived. The G1 to G4 may be applied to a reference image or a reference block, and the filter coefficient of the merge filter may be derived by applying the C1 to C4 to the respective basic filters.

A basic filter that may be generally used for all of input videos may be defined and used as the merge filter. Accordingly, filter performance may be different depending on an image (e.g., a reconstructed picture) within each input video.

Accordingly, in accordance with the aforementioned method proposed by the present invention, a basic filter can be updated in a specific unit (a picture, a frame or a block) so that an efficient basic filter can be used based on video characteristics, and filter performance can be improved.

Figure 11:
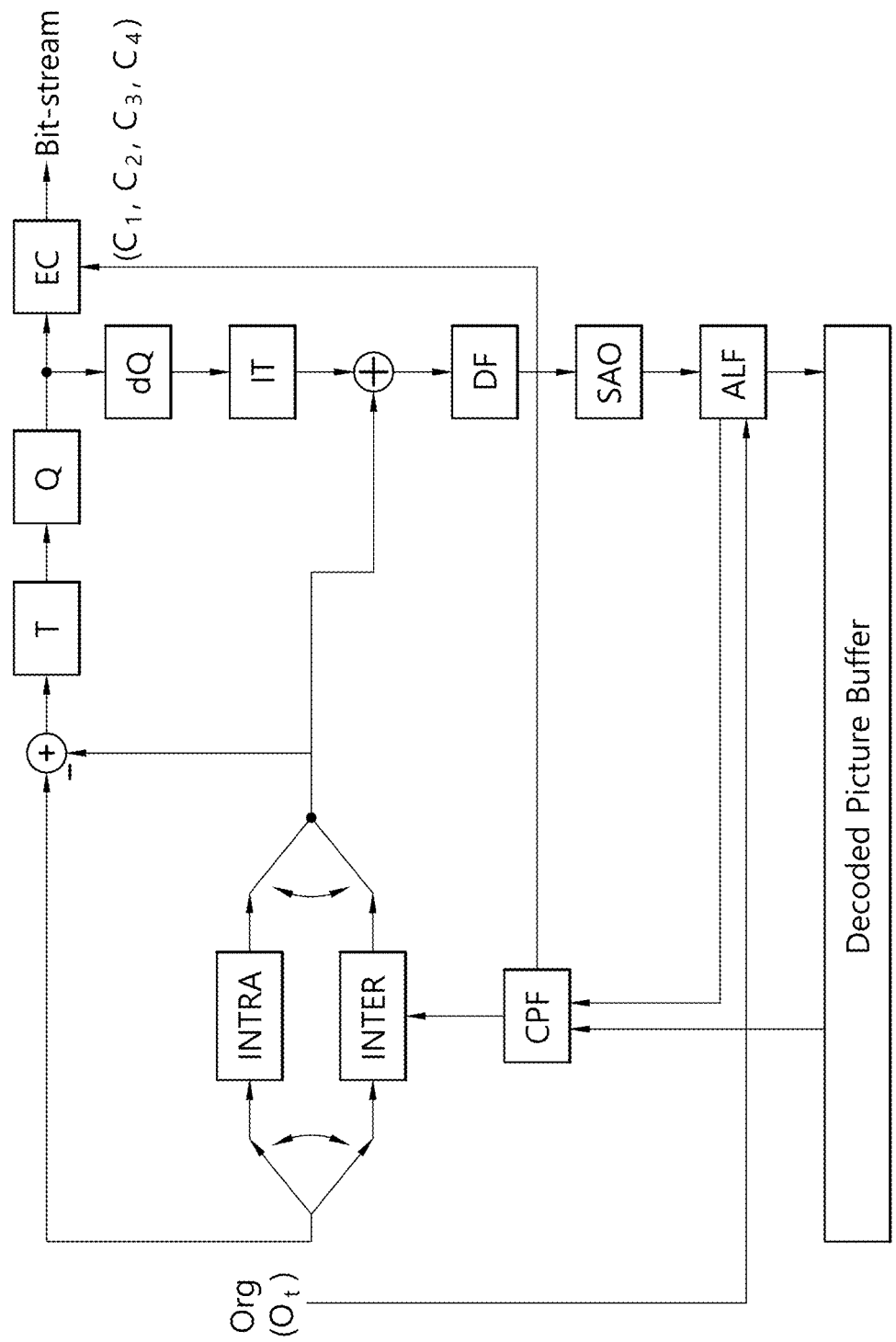
FIG. 11 illustrates an example in which a basic filter is updated based on an ALF.

FIG. 11 illustrates an example in which a basic filter is updated based on an ALF. If the merge filter is used for only the reference block of a prediction block as the adaptive filter as described above, the ALF may be used to improve visual quality of a reconstructed video including the reference block. In this case, the basic filter may be updated using the filter coefficient of the ALF. The filter coefficient of the ALF may be an ALF coefficient used in the previous frame (or previous picture) of a current frame (or current picture), and may be an ALF coefficient set used in a previously decoded previous frame (or previous picture) having the same quantization parameter (QP) and temporal level as a current frame (or current picture). If the basic filter is updated using the filter coefficient of the ALF, the basic filter may be updated in a slice, frame or PPS unit.

The encoding apparatus may generate a flag indicating whether the basic filter has been updated, and may encode and output the flag. Accordingly, a CPF basic filter can be adaptively updated. The flag may be referred to as a "CPF update flag." The value of the CPF update flag may indicate whether the basic filter of the CPF has been updated. For example, when the value of the CPF update flag is 1, the basic filter of the CPF may be updated. When the value of the CPF update flag is 0, the basic filter of the CPF may not be updated.

If the basic filter of the CPF is updated using the filter coefficient of the ALF and the ALF includes a plurality of filter coefficient sets, additional information regarding that which one of the plurality of filter coefficient sets included in the ALF will be updated may be necessary. In this case, the encoding apparatus may generate an ALF filter index indicative of one of the filter coefficient sets that is included in the ALF and that is used to update the basic filter of the merge filter, and may encode and output the ALF filter index. The filter coefficient set of the ALF indicated by the ALF filter index may be an ALF coefficient set used in the previous frame (or previous slice) of a current frame (or current slice), and may be an ALF coefficient set used in a previously decoded previous frame (or previous slice) having the same quantization parameter (QP) and temporal level as a current frame (or current slice).

The CPF update flag and the ALF filter index may be transmitted through syntax, such as Table 1.

TABLE 1

| slice_segment_header( ) { | Descriptor |
|---|---|
| ... | |
| for ( i=0; i < num cpf filters; i++ ) | |
| cpf_update_flag | u(1) |
| if( cpf update flag ) | |
| cpf_update_idx | u(v) |
| } | |

Referring to Table 1, the syntax element "num_cpf_filters" may correspond to a syntax element indicative of the number of basic filters. The syntax element "cpf_update_flag" may correspond to a CPF update flag. The syntax element "cpf_update_idx" may correspond to the ALF filter index.

Figure 12:
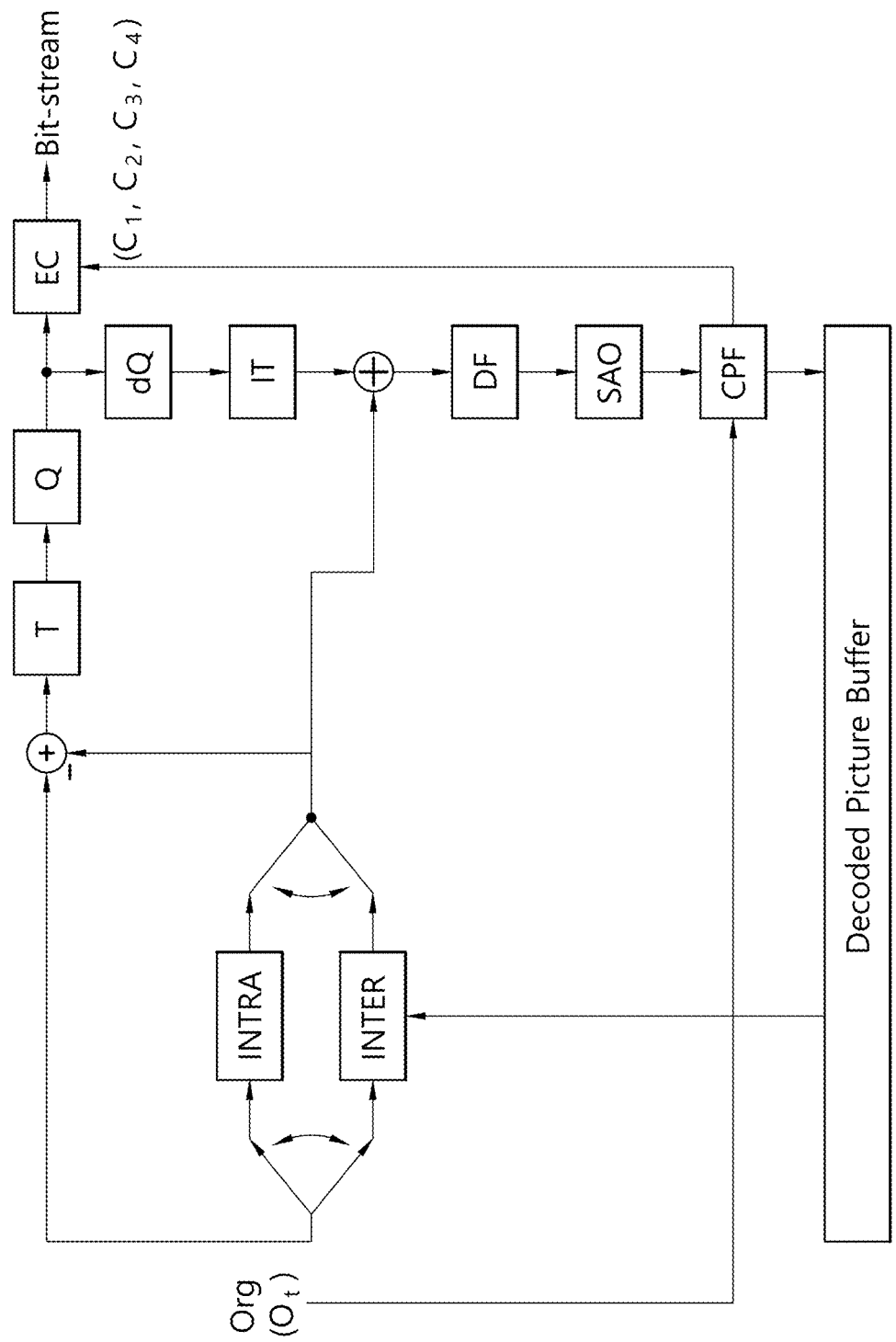
FIG. 12 illustrates an example of a CPF used as a loop filter.

FIG. 12 illustrates an example of a CPF used as a loop filter. The CPF may be used in a reference block for the improvement of visual quality of a prediction block in inter prediction, but may be used to improve visual quality of a reconstructed video as a loop filter. In this case, unlike in FIG. 11, the ALF is not used, but the CPF may be used. That is, the filter coefficient of a previous merge filter used in the previous frame (or previous slice) of a current frame (or current slice) may be used for the update of the filter coefficient of the basic filter. In this case, as described above, the basic filter cannot be updated based on the ALF, and as shown in FIG. 12, the filter coefficient of the basic filter of the current frame may be updated based on the filter coefficient of the previous CPF of the previous frame. The previous CPF of the previous frame (or previous slice) may indicate a previous CPF used in a previous frame (or previous slice) previously decoded prior to the decoding process of a current frame (or current slice) including the target region of filtering.

The filter coefficient of the previous CPF of the previous frame may have a single filter form. In contrast, the update may be performed on a plurality of basic filters. In order to update the basic filters, a plurality of filter forms may be necessary. Specifically, for example, one of the filter coefficients of the basic filters of the CPF may be substituted with the filter coefficient of the previous CPF or various filter forms may be generated from the filter coefficient of the previous CPF, and the basic filters of the CPF may be updated based on the filter forms.

If one of the basic filters of the CPF is updated, the encoding apparatus may generate information about a basic filter update indicative of a basic filter that belongs to the basic filters of the CPF and that will be updated with the filter coefficient of the previous CPF of the previous frame, and may encode and transmit the information. The information about the basic filter update may be transmitted through syntax, such as Table 2.

TABLE 2

| slice_segment_header( ) { | Descriptor |
|---|---|
| ... | |
| cpf_update_pos | u(v) |
| } | |

Referring to Table 2, the syntax element "cpf_update_pos" may correspond to information about the basic filter update of the CPF based on the filter coefficient of the CPF of the previous frame. In other words the syntax element "cpf_update_pos" may indicate whether which one of the basic filters of the CPF of the current frame will be updated based on the filter coefficient of the previous CPF of a previous frame. The decoding apparatus may update a basic filter that belongs to basic filters of the CPF and that is indicated by the syntax element "cpf_update_pos." The syntax element "cpf_update_pos" may be transmitted in a slice, frame or PPS unit.

If one of the basic filters of the CPF is updated, the decoding apparatus may select one of the basic filters without transmitting a syntax element for the update of the basic filter of the CPF, and may update the selected basic filter. For example, the decoding apparatus may select one of the basic filters of the CPF based on the value of modulation weight. Specifically, the decoding apparatus may update a basic filter having the greatest value of the modulation weight. The decoding apparatus may update a basic filter having the smallest value of the modulation weight.

If the plurality of basic filters is updated based on the filter coefficient of the previous CPF of the previous frame, they may be updated using various methods.

Figure 13:
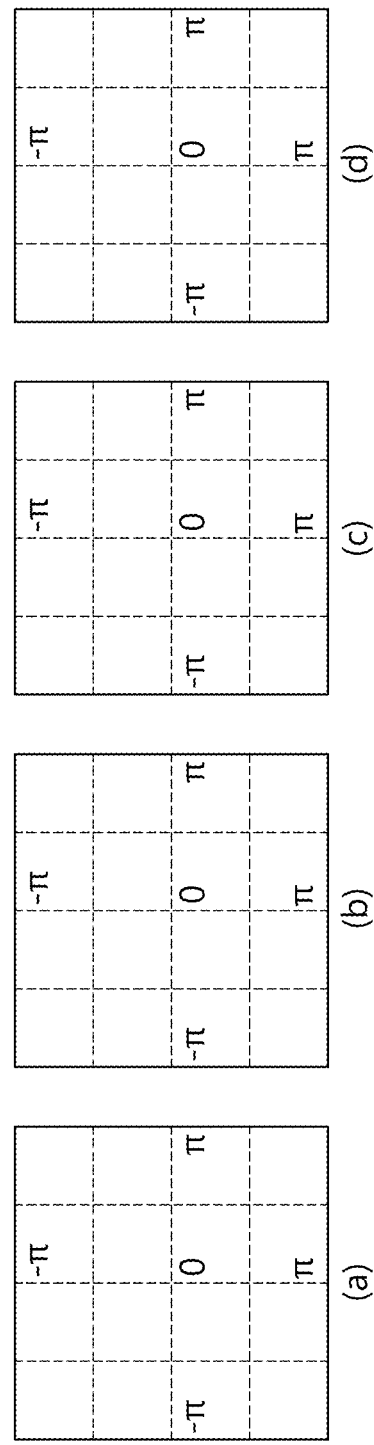
FIG. 13 illustrates an example of a method of decomposing the filter coefficient of a CPF of a previous frame (or previous slice) based on a frequency response.

FIG. 13 illustrates an example of a method of decomposing the filter coefficient of the previous CPF of a previous frame (or previous slice) based on a frequency response. Referring to FIG. 13, the filter coefficient of the previous CPF of the previous frame may be decomposed into several filter forms based on a frequency response, that is, a component within a frequency domain. The encoding apparatus/decoding apparatus may derive the filter coefficient of the CPF of a previous frame in the frequency domain that corresponds to the filter coefficient of the previous CPF of the previous frame defined in a spatial region based on frequency transform. If the filter coefficient of the previous CPF of the previous frame in the frequency domain is derived, the encoding apparatus/decoding apparatus may decompose the filter coefficient of the previous CPF of the previous frame in the frequency domain that has been derived using the method of FIG. 13. The filter coefficient of the previous CPF of the previous frame may be decomposed as a filter coefficient corresponding to each of a plurality of basic filters of the CPF of the current frame.

Referring to FIG. 13(a), a low frequency pass filter that transmits a low frequency (LF) component of the filter coefficient of the previous CPF of the previous frame (or previous slice) may be derived. Referring to FIG. 13(b), a high frequency pass filter that transmits a high frequency (HF) component of the filter coefficients of the previous CPF of the previous frame in the vertical direction on the frequency domain may be derived. Referring to FIG. 13(c), a high frequency pass filter that transmits a high frequency (HF) component of the filter coefficients of the previous CPF of the previous frame in the horizontal direction on the frequency domain may be derived. Referring to FIG. 13(d), a high frequency pass filter that transmits a high frequency (HF) component of the filter coefficients of the previous CPF of the previous frame in the diagonal direction based on the original point on the frequency domain may be derived.

Spatial region filters corresponding to the respective frequency bandpass filters may be generated based on frequency bandpass filters shown in FIGS. 13(a) to 13(d). The filter coefficient of a previous CPF applied to a previous frame (or previous slice) may be derived as a filter coefficient corresponding to each of the plurality of basic filters based on the generated spatial region filters. The plurality of basic filters may be updated based on the corresponding filter coefficients. The decoding apparatus may update the basic filter without additional syntax information through the aforementioned method.

In the aforementioned embodiment, an example in which the CPF includes the four basic filters has been described, but the CPF may include more basic filters. This case may be extended based on the aforementioned embodiment. Furthermore, the locations of the frequency components that transmit various frequency bandpass filters shown in FIGS. 13(a) to 13(d) may be changed in various manners.

Figure 14:
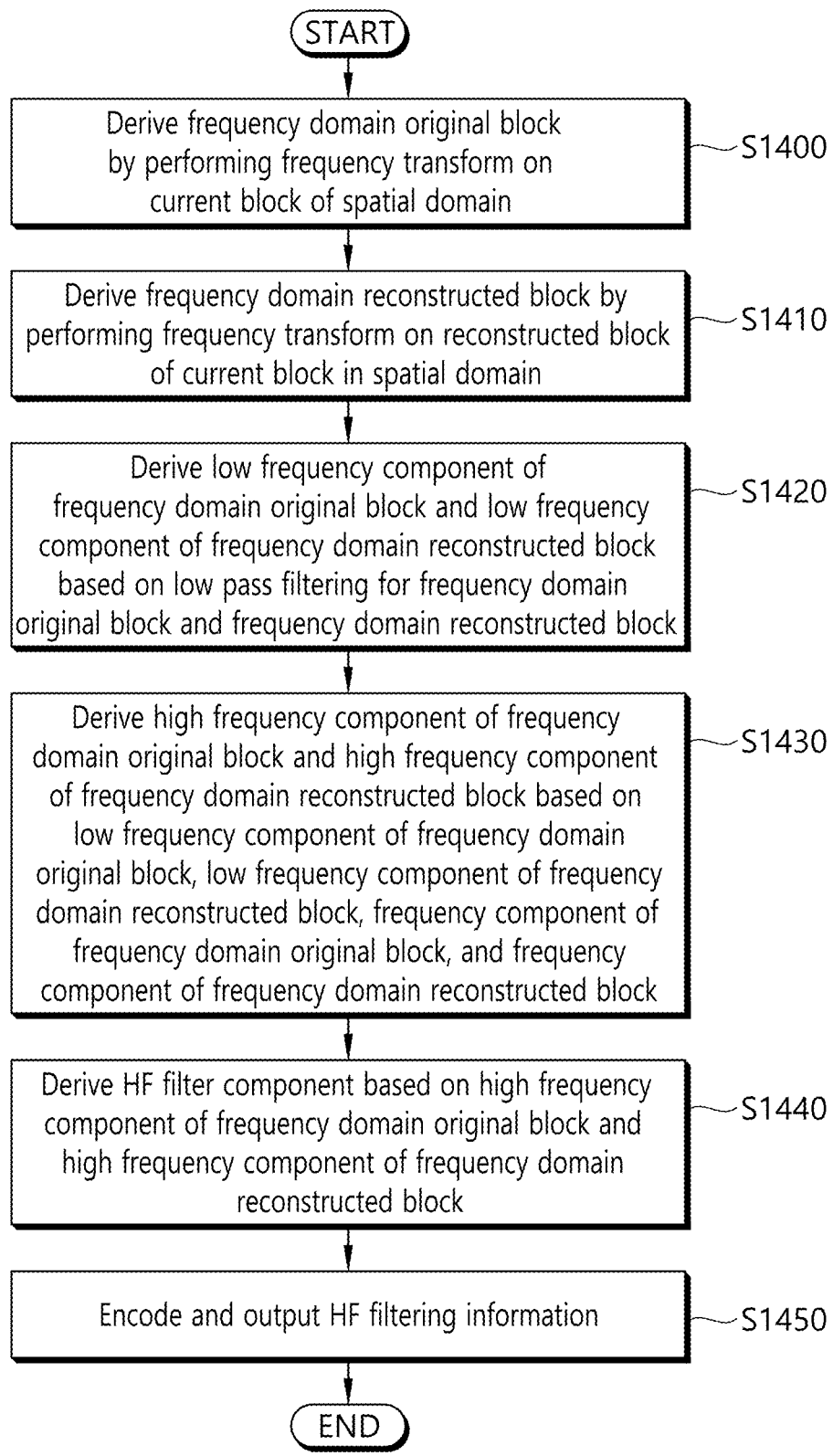
FIG. 14 schematically shows a video encoding method by the encoding apparatus according to the present invention.

FIG. 14 schematically shows a video encoding method by the encoding apparatus according to the present invention. The method disclosed in FIG. 14 may be performed by the encoding apparatus disclosed in FIG. 1. Specifically, For example, S1400 to S1410 of FIG. 14 may be performed by the transformer of the encoding apparatus, S1420 to S1440 thereof may be performed by the filter unit of the encoding apparatus, and S1450 thereof may be performed by the entropy encoder of the encoding apparatus.

The encoding apparatus derives a frequency domain original block by performing frequency transform on the current block of a spatial domain (S1400). The encoding apparatus may frequency-transform the original block of the current block in the spatial domain. The encoding apparatus may derive the frequency domain original block based on a frequency component corresponding to the original block in the frequency domain.

The encoding apparatus derives a frequency domain reconstructed block by performing frequency transform on the reconstructed block of the current block in the spatial domain (S1410). The encoding apparatus may frequency-transform the reconstructed block of the current block in the spatial domain. The reconstructed block may be a reconstructed block of the current block derived through an intra prediction mode. Furthermore, the reconstructed block may be a reconstructed block of the current block derived through an inter prediction mode. The encoding apparatus may derive the frequency domain reconstructed block based on a frequency component corresponding to the reconstructed block in the frequency domain.

The encoding apparatus derives a low frequency (LF) component of the frequency domain original block and a low frequency component of the frequency domain reconstructed block based on low pass filtering (LPF) for the frequency domain original block and the frequency domain reconstructed block (S1420). The encoding apparatus may derive the low frequency component of the frequency domain reconstructed block based on the low pass filtering for the frequency domain reconstructed block. The encoding apparatus may derive the low frequency component of the frequency domain original block based on the low pass filtering for the frequency original block. In this case, if a specific filter in the spatial domain is applied, the same function as LPF in the frequency domain may be substantially performed.

Meanwhile, the encoding apparatus may set the threshold of the low frequency component based on transform coefficients within the frequency domain reconstructed block included in the low frequency component. That is, the threshold of the low frequency component may indicate the size of the region of transform coefficients that belong to the transform coefficients within the frequency domain reconstructed block and that are included in the low frequency component. For example, if the size of the frequency domain reconstructed block is N×N, the coordinates of the top-left frequency component of the frequency domain reconstructed block are (0, 0), and transform coefficients that belong to the transform coefficients within the frequency domain reconstructed block and that are included in a region within an n-th column in an x axis and within an n-th row in a y axis are included in the low frequency component, the threshold of the low frequency component may be derived as "n." Specifically, if transform coefficients that belong to the transform coefficients within the frequency domain reconstructed block and that are included in a region within a second column in the x axis and a second row in the y axis are included in the low frequency component, the threshold of the low frequency component may be derived as 2. If transform coefficients that belong to the transform coefficients within the frequency domain reconstructed block and that are included in a region within a third column in the x axis and within a third row in the y axis are included in the low frequency component, the threshold of the low frequency component may be derived as 3.

The encoding apparatus derives a high frequency (HF) component of the frequency domain original block and a high frequency component of the frequency domain reconstructed block based on the low frequency component of the frequency domain original block, the low frequency component of the frequency domain reconstructed block, the frequency component of the frequency domain original block, and the frequency component of the frequency domain reconstructed block (S1430). The encoding apparatus may derive the high frequency component of the frequency domain reconstructed block based on a difference between the frequency component and low frequency component of the frequency domain reconstructed block. Furthermore, the encoding apparatus may derive the high frequency component of the frequency domain original block based on a difference between the frequency component and low frequency component of the frequency domain original block.

The encoding apparatus derives an HF filter component based on the high frequency component of the frequency domain original block and the high frequency component of the frequency domain reconstructed block (S1440). The encoding apparatus may perform filtering to minimize a difference between the high frequency component of the frequency domain original block and the high frequency component of the frequency domain reconstructed block according to a phase based on the high frequency components. That is, the encoding apparatus may perform filtering to minimize the amount of data of a frequency domain residual signal between the high frequency component of the frequency domain original block and the high frequency component of the frequency domain reconstructed block. The encoding apparatus may derive HF filtering information based on the filtering.

The filtering may be performed based on a Wiener filter. In other words, the encoding apparatus may perform filtering on the high frequency component of the frequency domain original block and the high frequency component of the frequency domain reconstructed block based on the Wiener filter. The encoding apparatus may derive the HF filtering information based on the filtering. The HF filtering information may include a wiener filter coefficient for the high frequency component of the frequency domain reconstructed block. In this case, the encoding apparatus may derive a modified frequency domain reconstructed block based on the filtered high frequency component and the low frequency component of the frequency domain reconstructed block. The modified frequency domain reconstructed block may be a combination of the filtered high frequency component and the low frequency component of the frequency domain reconstructed block.

Meanwhile, although not shown, the encoding apparatus may perform filtering to minimize a difference between the low frequency component of the frequency domain original block and the low frequency component of the frequency domain reconstructed block according to a phase based on the low frequency components. That is, the encoding apparatus may perform filtering to minimize the amount of data of a frequency domain residual signal between the low frequency component of the frequency domain original block and the low frequency component of the frequency domain reconstructed block. The encoding apparatus may derive LF filtering information based on the filtering.

The filtering may be performed based on a Wiener filter. In other words, the encoding apparatus may perform filtering on the low frequency component of the frequency domain original block and the low frequency component of the frequency domain reconstructed block based on the Wiener filter. The encoding apparatus may derive the LF filter information based on the filtering. The LF filter information may include a Wiener filter coefficient for the low frequency component of the frequency domain reconstructed block. In this case, the encoding apparatus may derive a modified frequency domain reconstructed block based on the filtered high frequency component of the frequency domain reconstructed block and the filtered low frequency component of the frequency domain reconstructed block. The modified frequency domain reconstructed block may be a combination of the filtered high frequency component of the frequency domain reconstructed block and the filtered low frequency component of the frequency domain reconstructed block.

The encoding apparatus encodes and outputs the HF filtering information (S1440). The encoding apparatus may entropy-encode the HF filtering information and output it in a bitstream form. Furthermore, the encoding apparatus may entropy-encode the LF filter information and output it in a bitstream form. The output bitstream may be transmitted or delivered to the decoding apparatus over a network or through a storage medium.

Although not shown, the encoding apparatus may encode and output information about a residual sample for the current block. The information about the residual sample may include transform coefficients regarding the residual sample.

Figure 15:
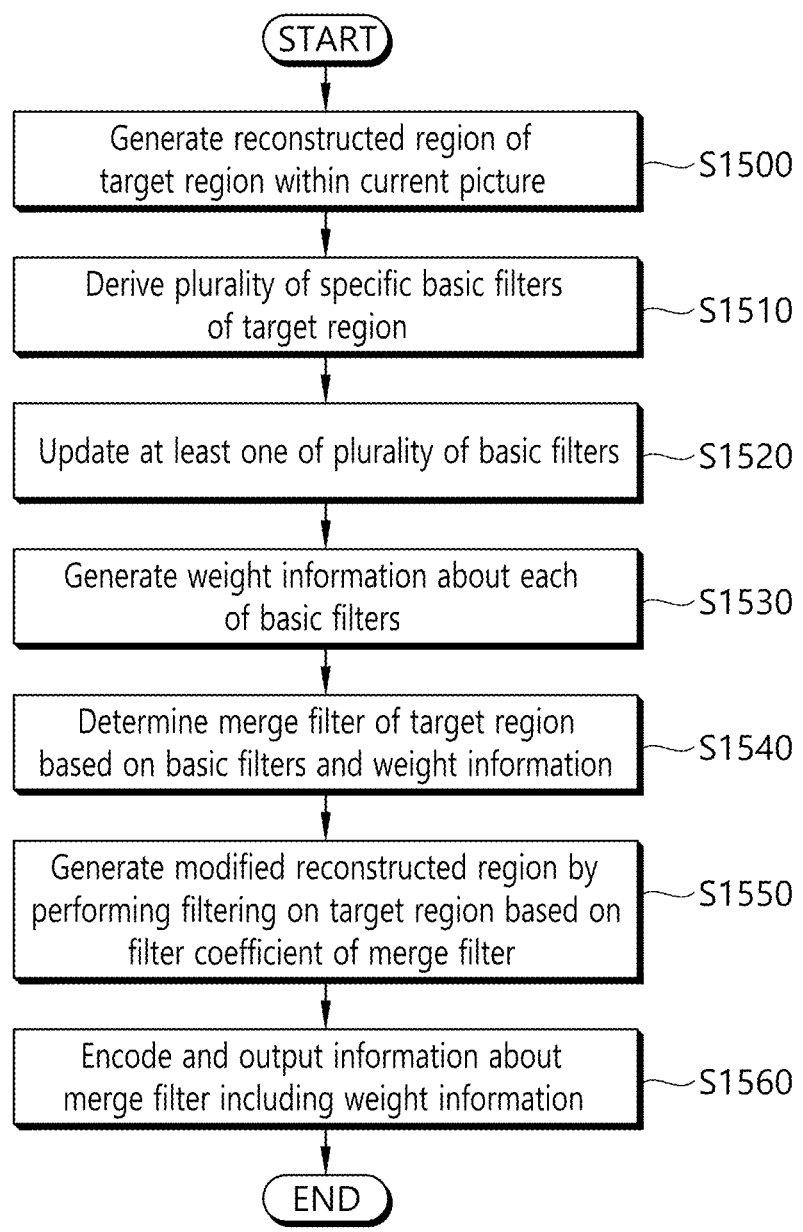
FIG. 15 schematically shows a video encoding method by the encoding apparatus according to the present invention.

FIG. 15 schematically shows a video encoding method by the encoding apparatus according to the present invention. The method disclosed in FIG. 15 may be performed by the encoding apparatus disclosed in FIG. 1. Specifically, for example, S1500 of FIG. 15 may be performed by the reconstruction region generation unit of the encoding apparatus, S1510 to S1540 thereof may be performed by the filter unit of the encoding apparatus, and S1550 thereof may be performed by the entropy encoder of the encoding apparatus.

The encoding apparatus generates the reconstructed region of a target region within a current picture (S1500). The encoding apparatus may generate the prediction region of the target region through an intra prediction mode or an inter prediction mode, and may generate the reconstructed region of the target region based on the prediction region.

The encoding apparatus derives a plurality of specific basic filters of the target region (S1510). The encoding apparatus may derive the plurality of basic filters of a merge filter for the target region. For example, the basic filters may include four basic filters.

The encoding apparatus updates at least one of the plurality of basic filters (S1520). The encoding apparatus may update filter information on which at least one of the plurality of basic filters has been applied to the previous slice (or previous frame) of a current slice (or current frame) including the target region.

For example, the encoding apparatus may update at least one of the plurality of basic filters based on an ALF coefficient applied to the previous slice of a current slice including the target region.

Specifically, the encoding apparatus may derive the adaptive linear filter (ALF) coefficient applied to the previous slice of the current slice including the target region. The previous slice may have the same quantization parameter as the target region or the previous slice may have the same temporal level as the target region.

The encoding apparatus may generate a flag indicating whether each of the plurality of basic filters has been updated. The flag may be referred to as a "CPF update flag." The value of the CPF update flag may indicate whether the basic filter of the CPF update flag has been updated. For example. When the value of the CPF update flag is 1, the filter coefficient of the basic filter of the CPF update flag may be updated. When the value of the CPF update flag is 0, the filter coefficient of the basic filter of the CPF update flag may not be updated.

Furthermore, if the ALF includes a plurality of filter coefficient sets, additional information regarding that the at least one basic filter will be updated using which one of the plurality of filter coefficient sets included in the ALF may be necessary. In this case, the encoding apparatus may generate an ALF filter index indicative of one of the filter coefficient sets included in the ALF to be used to update the basic filter.

For another example, the encoding apparatus may update the at least one of the plurality of basic filters based on the filter coefficient of a previous merge filter applied to the previous slice of a current slice including the target region. The filter coefficient of the previous merge filter applied to the previous slice may have a single filter form. Accordingly, the encoding apparatus may select one of the plurality of basic filters, and may update the filter coefficient of the selected basic filter based on the filter coefficient of the previous merge filter applied to the previous slice. In this case, the encoding apparatus may generate information about basic filter update indicative of a basic filter that belongs to the basic filters of the CPF and that is to be updated with the filter coefficient of the previous merge filter of the previous frame. A syntax element corresponding to the information may be transmitted in a slice, frame or PPS unit. Alternatively, the encoding apparatus may select one of the basic filters without transmitting the information, and may update the filter coefficient of the basic filter. For example, the encoding apparatus may select a basic filter that belongs to the plurality of basic filters and that has a minimum value of weight information, or may select a basic filter that belongs to the plurality of basic filters and that has a maximum value of weight information. The weight information may be referred to as "modulation weight."

Furthermore, the encoding apparatus may derive the filter coefficient of the previous merge filter applied to the previous slice as a filter coefficient corresponding to each of the plurality of basic filters based on a frequency response, and may update the filter coefficient of each of the plurality of basic filters based on a filter coefficient corresponding to each of the plurality of basic filters. The filter coefficient corresponding to each of the plurality of basic filters may be derived based on a frequency bandpass filter including a plurality of frequency bandpass filters and the filter coefficient of the previous merge filter. The frequency bandpass filter may include at least one of a low frequency pass filter that transmits a low frequency (LF) component, a high frequency pass filter that transmits a high frequency (HF) component in a vertical direction on a frequency domain, a high frequency pass filter that transmits a high frequency (HF) component in a horizontal direction on the frequency domain, and a high frequency pass filter that transmits a high frequency (HF) component in a diagonal direction based on the original point on the frequency domain. The filter coefficient corresponding to each of the plurality of basic filters may be derived by applying the frequency bandpass filter to the filter coefficient of the previous merge filter.

Although an update unit has been illustrated being a slice, the update may be performed using a slice, frame or PPS as an update unit.

The encoding apparatus generates weight information about each of the basic filters (S1530). The encoding apparatus may generate the weight information about each of the plurality of basic filters including the updated basic filter.

The encoding apparatus determines the merge filter of the target region based on the basic filters and the weight information (S1540). The encoding apparatus may apply the weight information about each basic filter to the filter coefficient of each basic filter, and may derive the filter coefficient of the merge filter based on the filter coefficients of the basic filters. The encoding apparatus may multiply the filter coefficient of each of the basic filters by the value of the weight information about each of the basic filters, and may derive the filter coefficient of the merge filter based on the multiplied filter coefficient of the basic filter. The weight information may be referred to as "modulation weight."

The encoding apparatus generates a modified reconstructed region by performing filtering on the target region based on the filter coefficient of the merge filter (S1550). The encoding apparatus may perform filtering on the target region based on the filter coefficient of the merge filter. The encoding apparatus may generate the modified reconstructed region based on the filtered target region. The generated reconstructed region may be stored in the memory and subsequently used for intra prediction and/or inter prediction.

The encoding apparatus encodes and outputs information about the merge filter including the weight information (S1560). The encoding apparatus may entropy-encode the information about the merge filter and output it in a bitstream form. The information about the merge filter may include the weight information about the basic filter. Furthermore, the encoding apparatus may generate a CPF update flag indicating whether the basic filter has been updated, and may encode and output the CPF update flag in a bitstream form. Furthermore, the encoding apparatus may generate information about basic filter update indicative of a basic filter of the current block that belongs to the basic filters of the current block and that will be derived as the update target basic filter, and may encode and output the information in a bitstream form. Furthermore, the encoding apparatus may generate an ALF filter index indicative of a filter coefficient set that belongs to filter coefficient sets included in the ALF and that is used to update the basic filter, and may encode and output the ALF filter index in a bitstream form. The bitstream may be transmitted to the decoding apparatus over a network or through a storage medium.

Although not shown, the encoding apparatus may encode and output information about the residual sample of the current block. The information about the residual sample may include transform coefficients regarding the residual sample.

Figure 16:
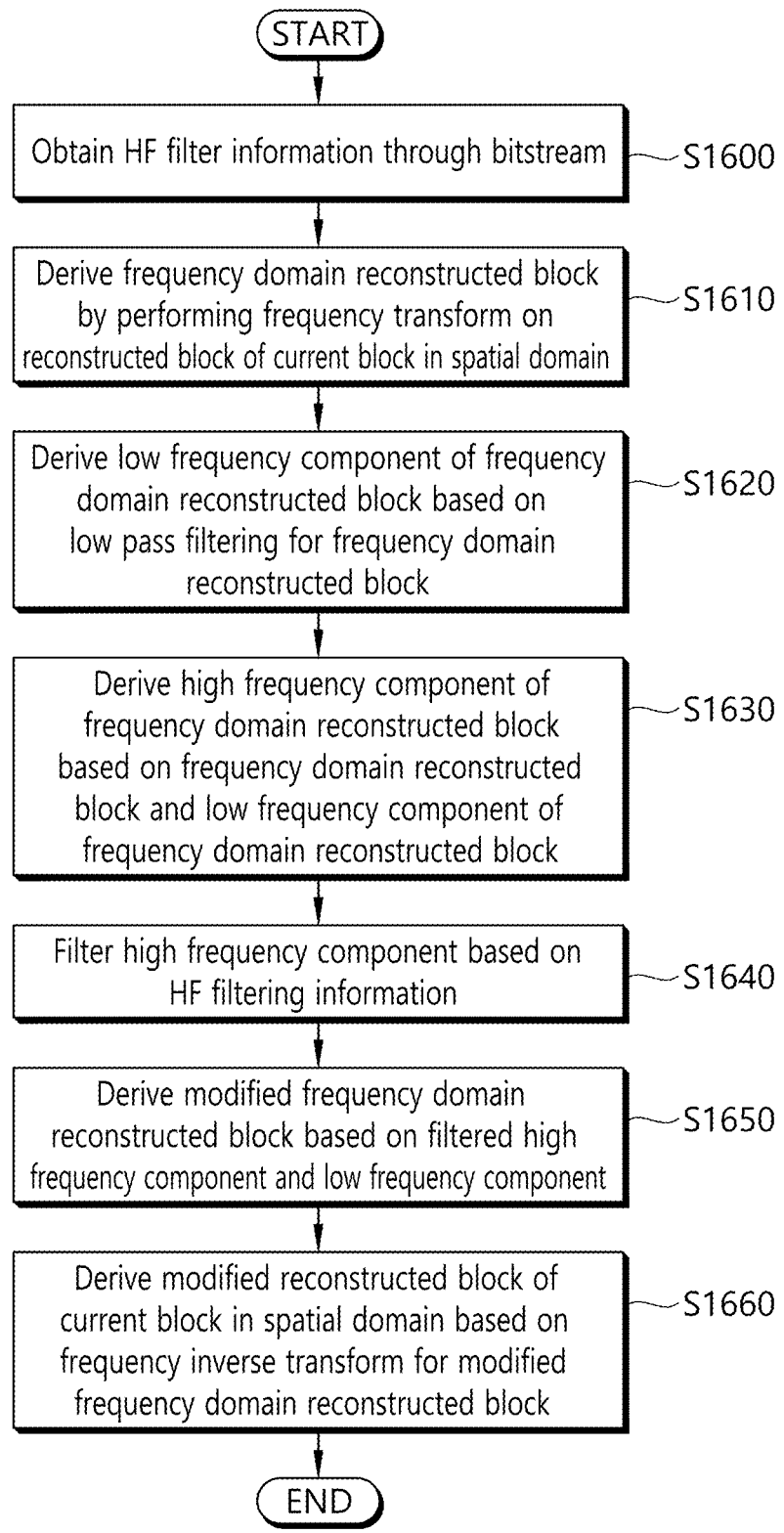
FIG. 16 schematically shows a video coding method by the decoding apparatus according to the present invention.

FIG. 16 schematically shows a video coding method by the decoding apparatus according to the present invention. The method disclosed in FIG. 16 may be performed by the decoding apparatus disclosed in FIG. 2. Specifically, for example, S1600 of FIG. 16 may be performed by the entropy decoder of the decoding apparatus, S1610 thereof may be performed by the transformer of the decoding apparatus, S1620 to S1640 thereof may be performed by the filter unit of the decoding apparatus, and S1650 thereof may be performed by the inverse transformer of the decoding apparatus.

The decoding apparatus obtains high frequency (HF) filter information through a bitstream (S1600). The HF filtering information may include filter information of filtering about the high frequency component of a current block. The decoding apparatus may obtain the HF filtering information through a bitstream. Furthermore, the HF filtering information may be derived based on filtering performed based on a Wiener filter. The HF filtering information may include a Wiener filter coefficient for the high frequency component of the current block.

Meanwhile, although not shown, the decoding apparatus may obtain low frequency (LF) filter information through a bitstream. The LF filter information may include filter information of filtering about the low frequency component of the current block. Furthermore, the LF filter information may be derived based on filtering performed based on a Wiener filter. The LF filter information may include a Wiener filter coefficient for the low frequency component of the current block.

The decoding apparatus derives a frequency domain reconstructed block by performing frequency transform on the reconstructed block of the current block in a spatial domain (S1610). The decoding apparatus may frequency-transform the reconstructed block of the current block in the spatial domain. The reconstructed block may be a reconstructed block of the current block derived through an intra prediction mode. Furthermore, the reconstructed block may be a reconstructed block of the current block derived through an intra prediction mode. The decoding apparatus may derive the frequency domain reconstructed block based on a frequency component corresponding to the reconstructed block in the frequency domain.

The decoding apparatus derives a low frequency (LF) component of the frequency domain reconstructed block based on low pass filtering (LPF) for the frequency domain reconstructed block (S1620). The decoding apparatus may derive the low frequency component of the frequency domain reconstructed block based on the low pass filtering for the frequency domain reconstructed block. In this case, if a specific filter in the spatial domain is applied, substantially the same function as LPF in the frequency domain may be performed.

Meanwhile, the decoding apparatus may derive the threshold of the low frequency component indicative of the size of a region including the low frequency component of the frequency domain reconstructed block. The threshold of the low frequency component may be previously defined and may be obtained through a bitstream.

If the size of a frequency domain preliminary reconstructed block is N×N, the coordinates of the top-left frequency component of the frequency domain preliminary reconstructed block are (0, 0), and the threshold of the low frequency component is n, transform coefficients that belong to transform coefficients within the frequency domain reconstructed block and that is included in a region within an n-th column in an x axis and within an n-th row in a y axis may be included in the low frequency component. Specifically, for example, the threshold of the low frequency component may be 2, and the threshold of the low frequency component may be 3.

The decoding apparatus derives the high frequency (HF) component of the frequency domain reconstructed block based on the frequency domain reconstructed block and the low frequency component of the frequency domain reconstructed block (S1630). The decoding apparatus may derive the high frequency component of the frequency domain reconstructed block based on a difference between based on a difference between the frequency component and low frequency component of the frequency domain reconstructed block.

The decoding apparatus filters the high frequency component based on the HF filtering information (S1640). The decoding apparatus may perform filtering on the high frequency component of the frequency domain reconstructed block based on the HF filtering information.

For example, the HF filtering information may include a Wiener filter coefficient for the high frequency component of the frequency domain reconstructed block. In this case, the decoding apparatus may perform filtering on the high frequency component through a Wiener filter based on the Wiener filter coefficient.

Meanwhile, although not shown, the decoding apparatus may perform filtering on the low frequency component of the frequency domain reconstructed block based on LF filter information.

For example, the LF filter information may include a Wiener filter coefficient for the low frequency component of the frequency domain reconstructed block. In this case, the decoding apparatus may perform filtering on the low frequency component through a Wiener filter based on the Wiener filter coefficient.

The decoding apparatus derives a modified frequency domain reconstructed block based on the filtered high frequency component and low frequency component (S1650). The modified frequency domain reconstructed block may be a combination of the filtered high frequency component and the low frequency component of the frequency domain reconstructed block.

If filtering has been performed on the low frequency component of the frequency domain reconstructed block, the low frequency component may be filtered based on the LF filter information. In this case, the modified frequency domain reconstructed block may be a combination of the filtered high frequency component and the filtered low frequency component.

The decoding apparatus derives a modified reconstructed block of the current block in the spatial domain based on frequency inverse transform for the modified frequency domain reconstructed block (S1660). The decoding apparatus may generate the modified reconstructed block of the spatial domain by performing frequency inverse transform on the modified frequency domain reconstructed block. The decoding apparatus may generate a reconstructed picture based on the modified reconstructed block. The modified frequency domain reconstructed block and/or the modified reconstructed block of the spatial domain may be stored in the memory and subsequently used for intra prediction and/or inter prediction.

FIG. 17 schematically shows a video coding method by the decoding apparatus according to the present invention. The method disclosed in FIG. 17 may be performed by the decoding apparatus disclosed in FIG. 2. Specifically, for example, in FIG. 17, S1700 may be performed by the reconstruction region generation unit of the decoding apparatus, S1710 to S1720 and S1740 to S1750 may be performed by the filter unit of the decoding apparatus, and S1730 may be performed by the entropy decoder of the decoding apparatus.

The decoding apparatus generates the reconstructed region of a target region within a current picture (S1700). The decoding apparatus may generate the prediction region of the target region through an intra prediction mode or an inter prediction mode, and may directly use the prediction region as a reconstructed region or may generate the reconstructed region by adding a residual signal to the prediction region.

The decoding apparatus derives a plurality of specific basic filters for the target region (S1710). The decoding apparatus may derive the plurality of basic filters of the merge filter of the target region. For example, the basic filters may include four basic filters.

The decoding apparatus updates at least one of the plurality of basic filters (S1720). The decoding apparatus may be updated based on filter information on which at least one of the plurality of basic filters is applied to the previous slice (or previous frame) of a current slice (or current frame) including the target region.

For example, the decoding apparatus may update at least one of the plurality of basic filters based on an ALF coefficient applied to the previous slice of a current slice including the target region.

Specifically, the decoding apparatus may derive the adaptive linear filter (ALF) coefficient applied to the previous slice of the current slice including the target region. The previous slice may have the same quantization parameter as the target region or the previous slice may have the same temporal level as the target region.

The decoding apparatus may obtain a flag indicating whether each of the plurality of basic filters has been updated through a bitstream. The flag may be referred to as a "CPF update flag." The value of the CPF update flag may indicate whether the basic filter of the CPF update flag has been updated. For example, when the value of the CPF update flag is 1, the filter coefficient of the basic filter of the CPF update flag may be updated. When the value of the CPF update flag is 0, the filter coefficient of the basic filter of the CPF may not be updated.

Furthermore, if the ALF includes a plurality of filter coefficient sets, additional information regarding that the at least one basic filter will be updated using which one of the plurality of filter coefficient sets included in the ALF may be necessary. In this case, the decoding apparatus may obtain an ALF filter index indicative of one of the filter coefficient sets included in the ALF to be used to update the basic filter through the bitstream.

For another example, the decoding apparatus may update the at least one of the plurality of basic filters based on the filter coefficient of a previous merge filter applied to the previous slice of a current slice including the target region. The filter coefficient of the previous merge filter applied to the previous slice may have a single filter form. Accordingly, the decoding apparatus may select one of the plurality of basic filters, and may update the filter coefficient of the selected basic filter based on the filter coefficient of the previous merge filter applied to the previous slice. In this case, the decoding apparatus may obtain information about basic filter update indicative of a basic filter that belongs to the basic filters of the CPF and that is to be updated with the filter coefficient of the previous merge filter of the previous frame through the bitstream. A syntax element corresponding to the information may be transmitted in a slice, frame or PPS unit. Alternatively, the decoding apparatus may select one of the basic filters without transmitting the information, and may update the filter coefficient of the basic filter. For example, the decoding apparatus may select a basic filter that belongs to the plurality of basic filters and that has a minimum value of weight information, or may select a basic filter that belongs to the plurality of basic filters and that has a maximum value of weight information. The weight information may be referred to as "modulation weight."

Furthermore, the decoding apparatus may derive the filter coefficient of the previous merge filter applied to the previous slice as a filter coefficient corresponding to each of the plurality of basic filters based on a frequency response, and may update the filter coefficient of each of the plurality of basic filters based on a filter coefficient corresponding to each of the plurality of basic filters. The filter coefficient corresponding to each of the plurality of basic filters may be derived based on a frequency bandpass filter including a plurality of frequency bandpass filters and the filter coefficient of the previous merge filter. The frequency bandpass filter may include at least one of a low frequency pass filter that transmits a low frequency (LF) component, a high frequency pass filter that transmits a high frequency (HF) component in a vertical direction on a frequency domain, a high frequency pass filter that transmits a high frequency (HF) component in a horizontal direction on the frequency domain, and a high frequency pass filter that transmits a high frequency (HF) component in a diagonal direction based on the original point on the frequency domain. The filter coefficient corresponding to each of the plurality of basic filters may be derived by applying the frequency bandpass filter to the filter coefficient of the previous merge filter.

Although an update unit has been illustrated being a slice, the update may be performed using a slice, frame or PPS as an update unit.

The decoding apparatus receives weight information about each of the basic filters (S1730). The decoding apparatus may obtain the weight information about each of the plurality of basic filters including the updated basic filter through a bitstream.

The decoding apparatus determines the merge filter of the target region based on the basic filters and the weight information (S1740). The decoding apparatus may apply the weight information about each basic filter to the filter coefficient of each basic filter, and may derive the filter coefficient of the merge filter based on the filter coefficients of the basic filters. The decoding apparatus may multiply the filter coefficient of each of the basic filters by the value of the weight information about each of the basic filters, and may derive the filter coefficient of the merge filter based on the multiplied filter coefficient of the basic filter. The weight information may be referred to as "modulation weight."

The decoding apparatus generates a modified reconstructed region by performing filtering on the target region based on the filter coefficient of the merge filter (S1750). The decoding apparatus may perform filtering on the target region based on the filter coefficient of the merge filter. The decoding apparatus may generate the modified reconstructed region based on the filtered target region. The generated reconstructed region may be stored in the memory and subsequently used for intra prediction and/or inter prediction.

In accordance with the present invention, the low frequency component and high frequency component of a current block may be separated and filtered, and thus the computational complexity of filtering can be reduced.

Furthermore, in accordance with the present invention, the low frequency component and high frequency component of a current block may be separated and filtered. Accordingly, the accuracy of filtering can be increased, and overall coding efficiency can be enhanced.

Furthermore, in accordance with the present invention, filter information suitable for visual quality improvement for a filtering target region can be updated. Accordingly, the accuracy of filtering can be increased, and overall coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the present invention may be implemented in a software form. The encoder and/or decoder according to the present invention may be included in a device that performs image processing in, a for example, TV, a computer, a smart phone, a set-top box, a display device, and the like.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include read-only memory (ROM), random access memory (RAM), flash memory, a memory card, a storage medium and/or other storage device.

What is claimed is:

1. A video decoding method performed by a video decoding apparatus, comprising steps of:
    obtaining high frequency (HF) filtering information through a bitstream;
    deriving a frequency domain reconstructed block by performing frequency transform on a reconstructed block of a current block in a spatial domain;
    deriving a low frequency component of the frequency domain reconstructed block based on low pass filtering for the frequency domain reconstructed block;
    deriving a high frequency component of the frequency domain reconstructed block based on the frequency domain reconstructed block and the low frequency component of the frequency domain reconstructed block;
    filtering the high frequency component based on the HF filtering information;
    deriving a modified frequency domain reconstructed block based on the filtered high frequency component and the low frequency component; and
    deriving a modified reconstructed block of the spatial domain for the current block based on frequency inverse transform for the modified frequency domain reconstructed block,
    wherein based on a size of the frequency domain preliminary reconstructed block which is N×N coordinates of a top-left frequency component of the frequency domain preliminary reconstructed block are (0, 0), and a threshold of the low frequency component is n, transform coefficients belonging to transform coefficients within the frequency domain reconstructed block and included in a region within an n-th column in an x axis and within an n-th row in a y axis are included in the low frequency component, and
    wherein the frequency transform is a block-based discrete cosine transform (DCT).

2. The video decoding method of claim 1, further comprising a step of obtaining low frequency (LF) filter information through the bitstream,
    wherein the low frequency component is filtered based on the LF filter information.

3. The video decoding method of claim 2, wherein the modified frequency domain reconstructed block is a combination of the filtered high frequency component and the filtered low frequency component.

4. The video decoding method of claim 1, wherein the HF filtering information comprises a Wiener filter coefficient of the high frequency component.

5. The video decoding method of claim 1, further comprising a step of obtaining the threshold of the low frequency component through the bitstream.

6. A video encoding method performed by a video encoding apparatus, comprising steps of:
    deriving a frequency domain original block by performing frequency transform on an original block of a current block in a spatial domain;
    deriving a frequency domain reconstructed block by performing frequency transform on a reconstructed block of the current block in the spatial domain;
    deriving a low frequency (LF) component of the frequency domain original block and a low frequency component of the frequency domain reconstructed block based on low pass filtering for the frequency domain original block and the frequency domain reconstructed block;
    deriving a high frequency component of the frequency domain original block and a high frequency component of the frequency domain reconstructed block based on the low frequency component of the frequency domain original block, the low frequency component of the frequency domain reconstructed block, a frequency component of the frequency domain original block, and a frequency component of the frequency domain reconstructed block;
    deriving high frequency (HF) filtering information based on the high frequency component of the frequency domain original block and the high frequency component of the frequency domain preliminary reconstructed block; and
    encoding and outputting the HF filtering information,
    wherein based on a size of the frequency domain preliminary reconstructed block which is N×N, coordinates of a top-left frequency component of the frequency domain preliminary reconstructed block are (0, 0), and a threshold of the low frequency component is n, transform coefficients belonging to transform coefficients within the frequency domain reconstructed block and included in a region within an n-th column in an x axis and within an n-th row in a y axis are included in the low frequency component, and
    wherein the frequency transform is a block-based discrete cosine transform (DCT).

7. The video encoding method of claim 6, further comprising steps of:
    deriving LF filter information based on the low frequency component of the frequency domain original block and the low frequency component of the frequency domain preliminary reconstructed block; and
    encoding and outputting the LF filter information.

* * * * *